(12) United States Patent
Yadav et al.

(10) Patent No.: US 11,152,615 B2
(45) Date of Patent: Oct. 19, 2021

(54) ELECTRODE DESIGNS FOR HIGH ENERGY DENSITY, EFFICIENCY, AND CAPACITY IN RECHARGEABLE ALKALINE BATTERIES

(71) Applicant: RESEARCH FOUNDATION OF THE CITY UNIVERSITY OF NEW YORK, New York, NY (US)

(72) Inventors: Gautam G. Yadav, New York, NY (US); Michael Nyce, New York, NY (US); Sanjoy Banerjee, New York, NY (US)

( * ) Notice: Subject to any disclaimer, the term of this patent is extended or adjusted under 35 U.S.C. 154(b) by 217 days.

(21) Appl. No.: 15/771,802

(22) PCT Filed: Oct. 28, 2016

(86) PCT No.: PCT/US2016/059394
§ 371 (c)(1),
(2) Date: Apr. 27, 2018

(87) PCT Pub. No.: WO2017/075404
PCT Pub. Date: May 4, 2017

(65) Prior Publication Data
US 2018/0323429 A1  Nov. 8, 2018

Related U.S. Application Data

(60) Provisional application No. 62/247,890, filed on Oct. 29, 2015, provisional application No. 62/263,177, filed on Dec. 4, 2015.

(51) Int. Cl.
*H01M 4/50* (2010.01)
*H01M 4/74* (2006.01)
(Continued)

(52) U.S. Cl.
CPC ............. *H01M 4/50* (2013.01); *H01M 4/24* (2013.01); *H01M 4/62* (2013.01); *H01M 4/622* (2013.01);
(Continued)

(58) Field of Classification Search
CPC ........ H01M 4/626; H01M 4/661; H01M 4/50; H01M 4/244; H01M 10/24; H01M 4/625;
(Continued)

(56) References Cited

U.S. PATENT DOCUMENTS 4,451,543 A    5/1984  Dzieciuch et al.
4,520,005 A *  5/1985  Yao .................. C01G 45/1221
                                                423/599
(Continued)

FOREIGN PATENT DOCUMENTS

CA      2890711 A1 *  5/2014  ............ H01M 4/244
CN     102513122 A    6/2012
(Continued)

OTHER PUBLICATIONS

Hashem, Ahmed M., et al., "Synthesis, structure, magnetic, electrical and electrochemical properties of Al, Cu, and Mg doped MNO2," Material Chemistry and Physics, 2011, pp. 33-38, vol. 130, Elsevier B.V.
(Continued)

*Primary Examiner* — Jonathan G Jelsma
*Assistant Examiner* — Omar M Kekia
(74) *Attorney, Agent, or Firm* — Andrew M. Metrailer

(57) ABSTRACT

A secondary alkaline battery includes an anode, a cathode, and an electrolyte. The cathode includes a current collector, a cathode mixture in electrical contact with the current collector. The cathode mixture comprises: manganese oxide, a copper compound comprising copper, a salt of copper, an alloy thereof, or any combination thereof, a bismuth com-
(Continued)

pound comprising bismuth, a salt of bismuth, or any combination thereof, and a conductive carbon. The secondary alkaline battery can also include a first composition in contact with the current collector and disposed between the current collector and the cathode mixture that includes copper, a salt of copper, an alloy thereof, or a combination thereof.

32 Claims, 11 Drawing Sheets

(51) Int. Cl.
  *H01M 4/62* (2006.01)
  *H01M 4/24* (2006.01)
  *H01M 10/24* (2006.01)
  *H01M 4/66* (2006.01)
(52) U.S. Cl.
  CPC .............. *H01M 4/626* (2013.01); *H01M 4/74* (2013.01); *H01M 10/24* (2013.01); *H01M 4/244* (2013.01); *H01M 4/625* (2013.01); *H01M 4/661* (2013.01)
(58) Field of Classification Search
  CPC ............ H01M 4/74; H01M 4/24; H01M 4/62; H01M 4/622
  USPC ........................................................ 429/224
  See application file for complete search history.

(56) References Cited

U.S. PATENT DOCUMENTS

| | | | |
|---|---|---|---|
| 4,957,827 | A | 9/1990 | Kordesch et al. |
| 5,011,752 | A | 4/1991 | Kordesch et al. |
| 5,089,027 | A | 2/1992 | Rossoll et al. |
| 5,156,934 | A | 10/1992 | Kainthia et al. |
| 5,250,374 | A | 10/1993 | Zhang |
| 5,952,124 | A | 9/1999 | Kainthla et al. |
| 7,718,305 | B2 | 5/2010 | Daniel-Ivad |
| 2005/0164089 | A1 | 7/2005 | Iltchev et al. |
| 2006/0147802 | A1 | 7/2006 | Yasuda et al. |
| 2010/0087885 | A1 | 4/2010 | Atanasoska et al. |
| 2011/0223477 | A1 | 9/2011 | Nelson et al. |
| 2012/0231323 | A1 | 9/2012 | Takagi et al. |
| 2013/0187083 | A1 | 7/2013 | Iwata et al. |
| 2015/0214552 | A1 | 7/2015 | Cho et al. |
| 2016/0149266 | A1* | 5/2016 | Cervera ................ H01M 4/244 |
| | | | 429/206 |

FOREIGN PATENT DOCUMENTS

| | | |
|---|---|---|
| CN | 102623188 A | 8/2012 |
| EP | 0138316 A1 | 4/1985 |
| JP | 2006225201 A | 8/2006 |
| WO | 9510858 A1 | 4/1995 |
| WO | 2014074830 A1 | 5/2014 |
| WO | 2016061030 A1 | 4/2016 |
| WO | 2017075404 A1 | 5/2017 |

OTHER PUBLICATIONS

Foreign Communication from a related Application—Search Report of European Patent Application No. 15851352 dated Apr. 16, 2018 (10 pages).
Office Action of U.S. Appl. No. 15/467,240 dated May 16, 2018, 11 pages.
International Preliminary Report on Patentability of International Application No. PCT/US2016/059394, dated May 11, 2018, 13 pages.
International Search Report and Written Opinion of International Application No. PCT/US2016/059394, dated Feb. 3, 2017, 16 pages.
Office Action of Application No. 15/394,975 dated Mar. 22, 2017 (13 pages).
Office Action of U.S. Appl. No. 15/394,975 dated Feb. 15, 2018 (12 pages).
Final Office Action of U.S. Appl. No. 15/394,975 dated Jul. 26, 2017 (18 pages).
Foreign Communication from the Priority Application—International Search Report and Written Opinion of PCT/US2015/055215, dated Feb. 5, 2016 (11 pages).
Wadsley, A. D., et al., "A Hydrous Manganese Oxide with Exchange Properties," Journal of American Chemical Society, 1950, pp. 1781-1784, vol. 72, No. 4, ACS Publications.
Office Action of U.S. Appl. No. 15/467,240 dated Jun. 2, 2017 (18 pages).

* cited by examiner

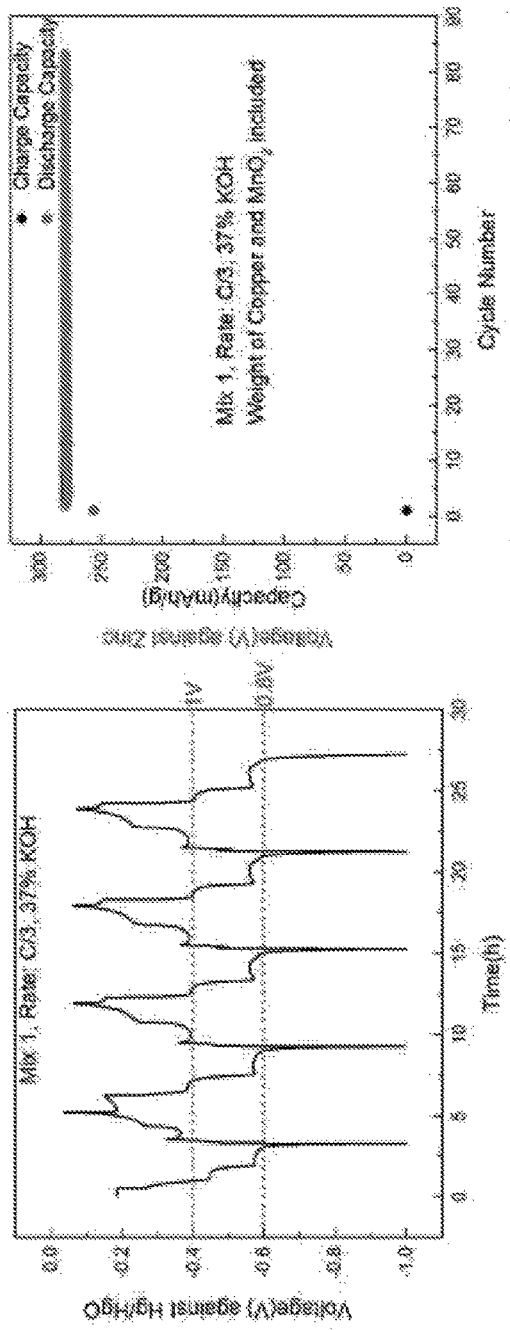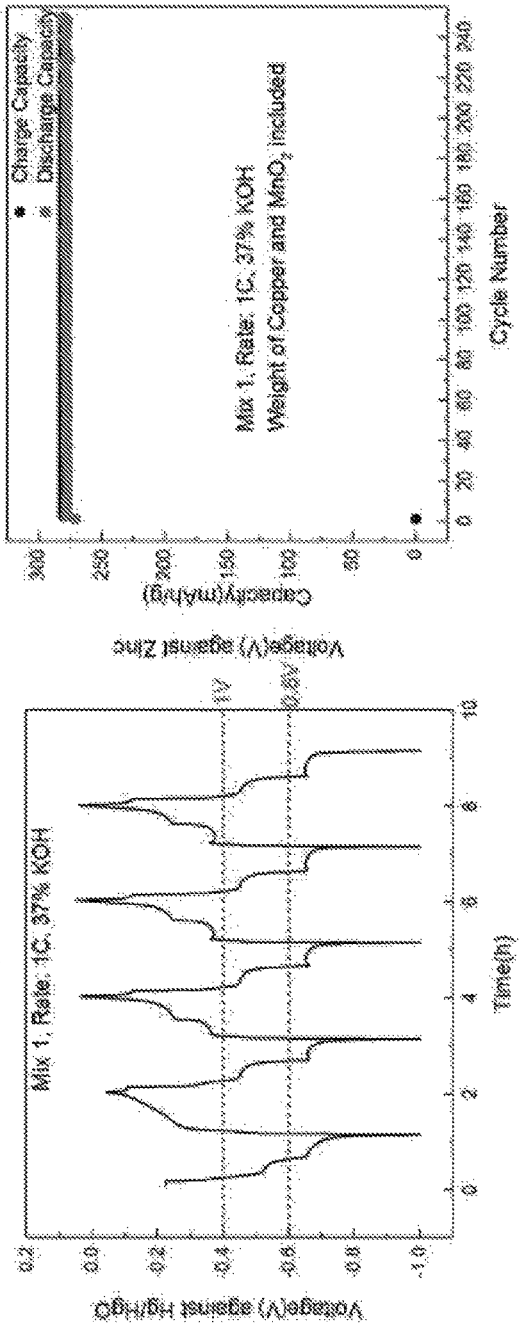
FIG. 3A  FIG. 3B  FIG. 3C  FIG. 3D

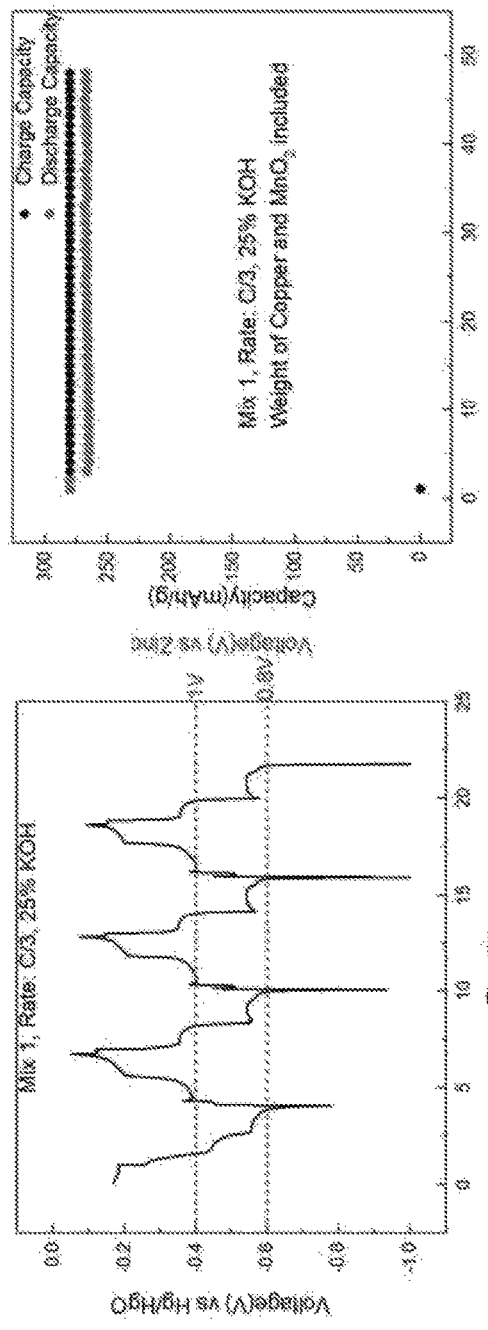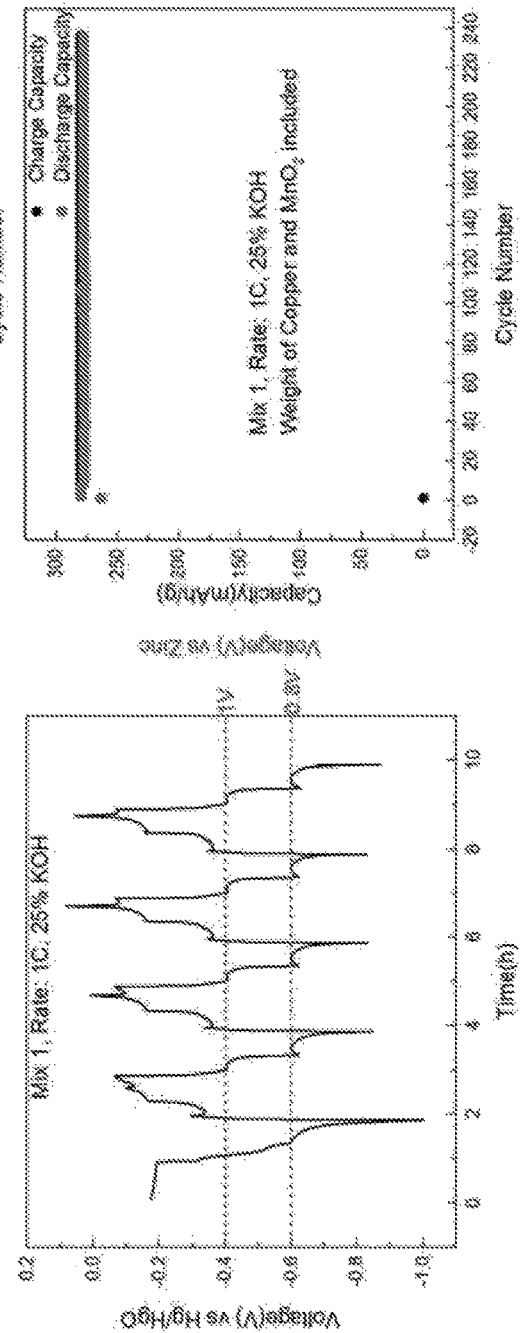
FIG. 4A  FIG. 4B  FIG. 4C  FIG. 4D

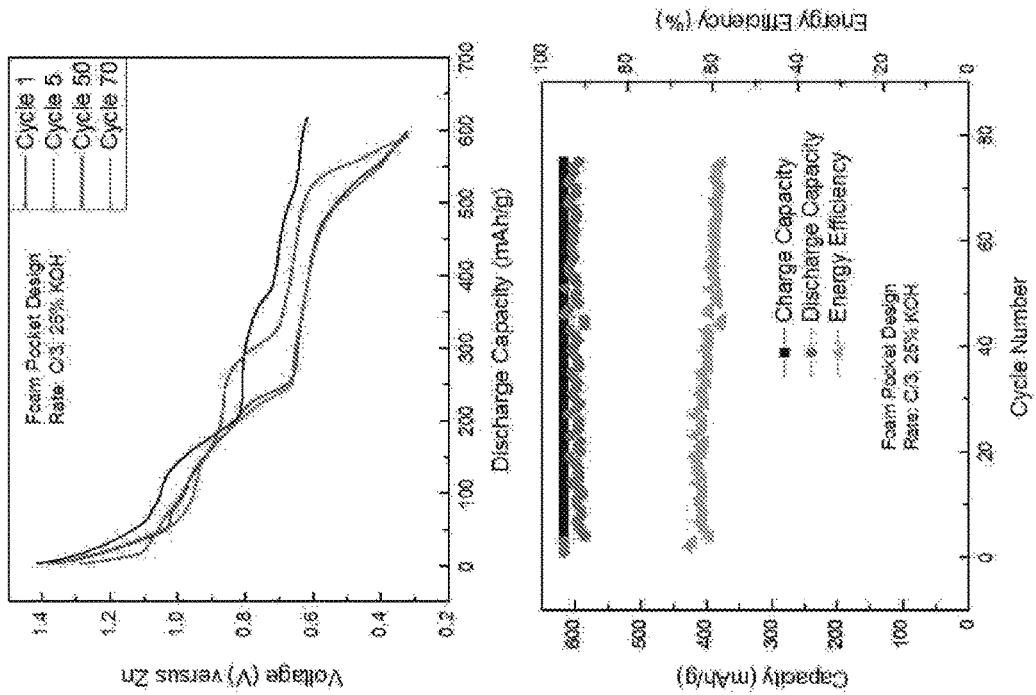
FIG. 9B
FIG. 9A
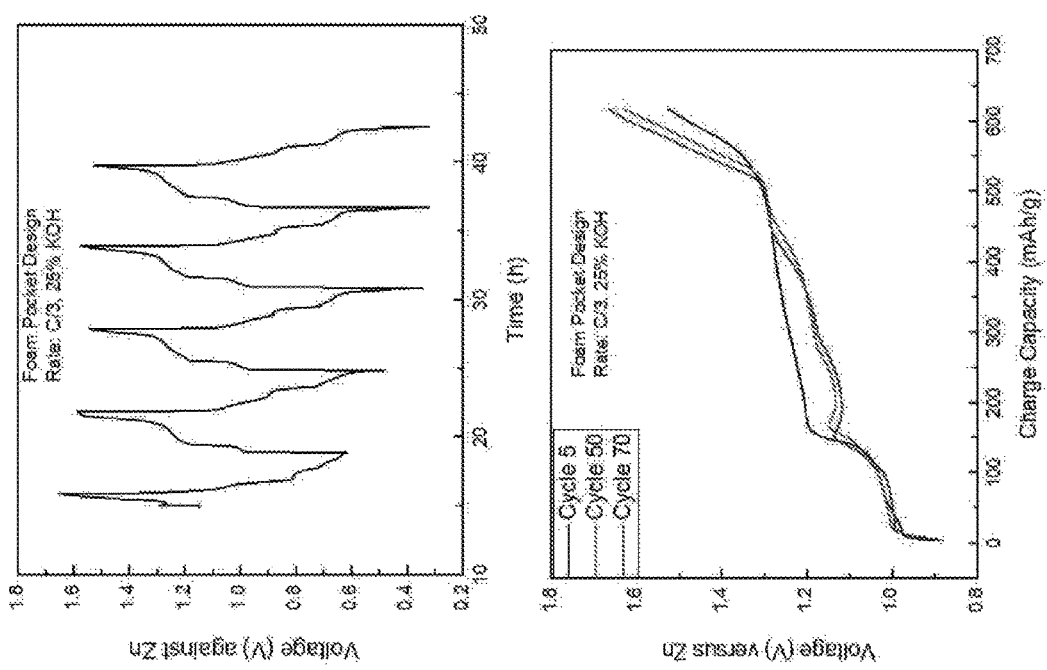
FIG. 9D
FIG. 9C

ELECTRODE DESIGNS FOR HIGH ENERGY DENSITY, EFFICIENCY, AND CAPACITY IN RECHARGEABLE ALKALINE BATTERIES

CROSS-REFERENCE TO RELATED APPLICATIONS

This application is a filing under 35 U.S.C. 371 as the National Stage of International Application No. PCT/US2016/059394, filed Oct. 28, 2016 and entitled "Electrode Deigns for High Energy Density, Efficiency, and Capacity in Rechargeable Alkaline Batteries", which claims the benefit of and priority to U.S. Provisional Application No. 62/247,890 filed on Oct. 29, 2015 and entitled "Novel Electrode Design To Improve Energy Efficiency In Rechargeable Second Electron Alkaline Batteries" by Gautam Yadav et al. and U.S. Provisional Application No. 62/263,177 filed on Dec. 4, 2015 and entitled "Hybrid Electrodes For High Energy Density And Capacity Alkaline Batteries" by Gautam Yadav et al., all of which are incorporated herein by reference in their entirety.

STATEMENT REGARDING FEDERALLY FUNDED RESEARCH OR DEVELOPMENT

The invention described and claimed herein was made in part utilizing funds supplied by the Advanced Research Projects Agency-E (APRA-E) of United States Department of Energy (DOE) under Contract No. DE-AR-0000150. The Government has certain rights in this invention.

BACKGROUND

Alkaline battery cells have been predominantly used as primary batteries (e.g., primary batteries, primary electrochemical cells, or primary cells), meaning that after a single discharge primary batteries are disposed of and replaced. Primary alkaline batteries are produced in high volume at low cost by numerous commercial manufacturers. However, the one-time use of primary batteries results in large material wastage as well as undesirable environmental consequences. Also, potential economic losses can arise due to the significant imbalance between the energy that is required to manufacture these cells compared to the energy that can actually be stored. As a consequence, there is an advantage to providing rechargeable or secondary cells, also known as secondary batteries, secondary electrochemical cells or secondary cells.

SUMMARY

In an embodiment, a secondary alkaline battery includes an anode, a cathode, and an electrolyte. The cathode includes a current collector, a cathode mixture in electrical contact with the current collector. The cathode mixture comprises: manganese oxide, a copper compound comprising copper, a salt of copper, an alloy thereof, or any combination thereof, a bismuth compound comprising bismuth, a salt of bismuth, or any combination thereof, and a conductive carbon. The secondary alkaline battery can also include a first composition in contact with the current collector and disposed between the current collector and the cathode mixture that includes copper, a salt of copper, an alloy thereof, or a combination thereof.

In an embodiment, a secondary alkaline battery comprises: an anode, and a cathode. The cathode comprises: a current collector; and a cathode mixture electrically coupled to the current collector. The cathode mixture comprises: manganese oxide ($MnO_2$); a metal compound comprising: tin, a salt of tin, aluminum, a salt of aluminum, iron, a salt of iron, vanadium, a salt of vanadium, or any combination thereof; a bismuth compound comprising bismuth, a salt of bismuth, or any combination thereof, and a conductive carbon.

In an embodiment, a battery comprising an electrode comprising: a metal substrate that is at least partially plated by copper, a copper alloy, or any combination thereof, a positive electrode comprising a cathode material, a negative electrode comprising an anode material, an alkaline electrolyte, and a polymeric separator disposed between the positive electrode and the negative electrode. The cathode material comprises a manganese compound and a bismuth compound, and the anode material comprises zinc, a zinc compound, or any combination thereof. The metal substrate is permeable to the alkaline electrolyte on a side of the metal substrate facing the polymeric separator, and the metal substrate is in electrical contact with either the cathode material or the anode material. In some instances, the metal substrate forms a pocket-shaped assembly, and the pocket-shaped assembly encloses either the cathode material or the anode material that is in electrical contact with the metal substrate.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3A illustrates voltage-time curves for the battery described with respect to Example 1 for the first 5 cycles at C/3 in 37% KOH electrolyte.

FIG. 3B illustrates a chart showing the charge and discharge capacity for the battery described with respect to Example 1 at C/3 in 37% KOH.

FIG. 3C illustrates voltage-time curves for the battery described with respect to Example 1 for the first 5 cycles at 1 C in 37% KOH electrolyte.

FIG. 3D illustrates a chart showing the charge and discharge capacity for the battery described with respect to Example 1 at 1 C in 37% KOH.

FIG. 4A illustrates voltage-time curves for the battery described with respect to Example 1 for the first 5 cycles at C/3 in 25% KOH electrolyte.

FIG. 4B illustrates a chart showing charge and discharge capacity for the battery described with respect to Example 1 at C/3 in 25% KOH.

FIG. 4C illustrates voltage-time curves for the battery described with respect to Example 1 for the first 5 cycles at 1 C in 25% KOH electrolyte.

FIG. 4D illustrates a chart showing charge and discharge capacity for the battery described with respect to Example 1 at 1 C in 25% KOH.

FIG. 9A illustrates foam pocket design voltage-time curves for the battery described with respect to Example 5 for the first 5 cycles at C/3 in 25% KOH electrolyte.

FIG. 9B illustrates foam pocket design discharge curves for the battery described with respect to Example 5 for different cycles at C/3 in 25% KOH.

FIG. 9C illustrates foam pocket design charge curves for the battery described with respect to Example 5 for different cycles at C/3 in 25% KOH electrolyte.

FIG. 9D illustrates foam pocket design capacity and energy efficiency versus cycle number for the battery described with respect to Example 5 at C/3 in 25% KOH.

DETAILED DESCRIPTION

Figure 1:
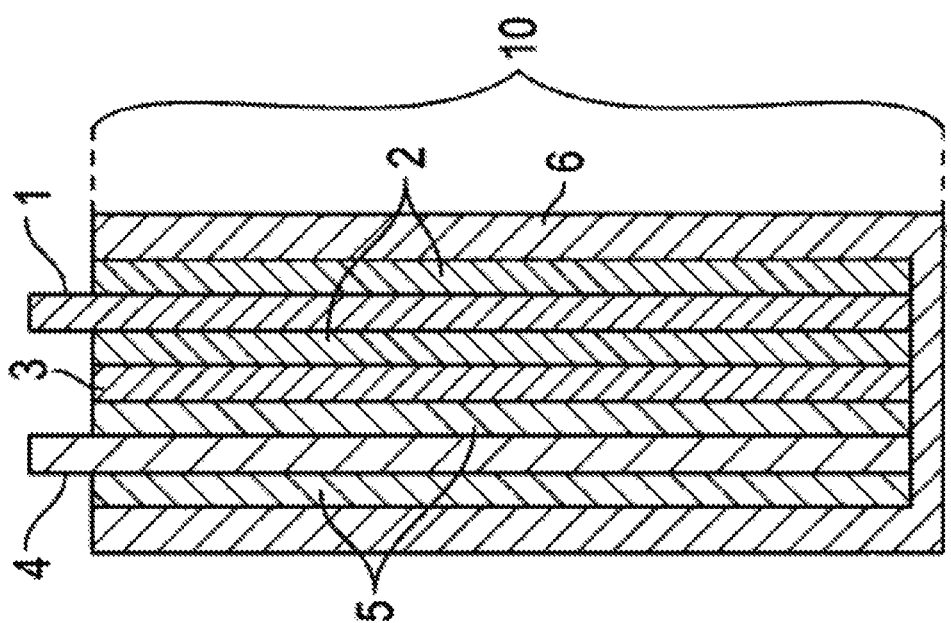
FIG. 1 is a schematic cross-sectional view of a cell according to an embodiment.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," "in some embodiments," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

In this disclosure, the terms "negative electrode" and "anode" are both used to mean "negative electrode." Likewise, the terms "positive electrode" and "cathode" are both used to mean "positive electrode."

In alkaline manganese dioxide cells, manganese dioxide has proven recalcitrant to use as a secondary (i.e., a rechargeable or reusable battery) due to fundamental problems with its crystal structure and side reactions which result in products that are not amenable to charge-discharge cycling. Efforts to develop the zinc-manganese dioxide battery system date back more than 40 years, with many unsuccessful attempts made to commercialize it. However, their lifetime is limited due to fall off in capacity at the high depths of discharge that are of interest in many commercial applications. Due to these limitations, rechargeable alkaline batteries have not yet witnessed widespread adoption. In the copper-zinc alkaline cells, copper oxide which is used as the cathode material is not able to be recharged back after the first discharge due to a complex reaction mechanism that is not fully understood. It also has the disadvantage of delivering its entire capacity at a lower voltage against zinc that makes it unsuitable for practical applications.

Rechargeable alkaline manganese dioxide batteries that are currently available in the market are limited to around 5-10% of the theoretical capacity of 617 mAh/g. This is primarily due to the manganese dioxide crystal undergoing stressful phase transformations that lead to its eventual breakdown and loss of rechargeable material. It is also due to the zinc dissolving in the electrolyte to form zincate ions that interact with the manganese dioxide during the phase transformations in a detrimental way to form electrochemical inactive phases. To mitigate the problems of lattice dilations and stressful phase transformations it has been found that synthesizing the birnessite-phase of manganese dioxide, and incorporating bismuth and lead in the crystal structure through physical or chemical means imparted rechargeability characteristics to the manganese dioxide material. In some cases, up to 80-90% of the second electron capacity can be obtained during potentiodynamic cycling tests.

The use of oxides or hydroxides of bismuth coated on manganese dioxide along with the heating of nitrates of bismuth and manganese can be used to create a phase of bismuth-manganese dioxide. The bismuth in these configurations can play a role in imparting rechargeability characteristics initially during potentiodynamic scans. However, this type of battery cannot develop high cycle life with good reliability and reproducibility when cycled galvanostatically using practical battery cycling protocols. Extensive testing indicates that, within a few charge-discharge cycles, the depth of discharge obtainable falls off rapidly with a large loss of capacity. Also, in the case of the copper-zinc alkaline cells, copper or copper oxide cathodes are known to have a large theoretical capacity. Copper's theoretical capacity is 844 mAh/g based on two electron reactions. However, its reaction mechanism is complicated and is known to go through a dissolution precipitation reaction that can lead to the eventual loss of material and possible inactive phase formations that lead to its catastrophic failure after the first discharge.

Disclosed herein is a cell containing a cathode having a combination of active materials such as manganese dioxide, copper, tin, iron, aluminum, magnesium, vanadium and bismuth in various combinations to create hybrid cathodes or standalone cathodes like copper to deliver high capacity at nominal voltages to deliver high energy. These cells can deliver high capacities and energies, and do so in a rechargeable way. This represents a major breakthrough in the field.

Also described herein are cells that can comprise a battery housing, a mixture of birnessite-type or EMD-type manganese dioxide, bismuth and/or derivatives of bismuth, and conductive carbon enclosed in a pocket shaped electrode assembly that can be plated with or contain copper, a zinc anode negative electrode supported in the battery housing, a spacer deposited between the positive and negative electrodes, and an alkaline electrolyte contained within the battery housing. The spacer can serve to demarcate the positive electrode from the negative electrode. This battery can demonstrate a high depth of discharge (near the second electron capacity) with higher energy efficiency for many more cycles than previous rechargeable alkaline manganese dioxide batteries that also provide the second electron capacity but with lower energy efficiency.

As further described below, a rechargeable alkaline cell can contain a mixture of (1) manganese dioxide, copper and bismuth, or (2) manganese dioxide and copper, or manganese dioxide mixed with either individual or combined elements like copper, bismuth and metals active in the cathode electrochemical spectrum (derivatives or metal forms of iron, aluminum, tin, magnesium, and vanadium) and only (i.e. consisting essentially of) copper as the cathode. The cells can use the birnessite-type or EMD-type of manganese dioxide cathode, or other forms of manganese dioxide that can be used to produce birnessite in-situ during battery cycling, which can be produced using methods that can be implemented in large-scale manufacturing, addition of copper or derivatives of copper, addition of various derivatives or metal forms of metals like tin, iron, magnesium, aluminum and vanadium, and bismuth or derivatives of bismuth in various forms and the development of novel binders that help deliver a large capacity at nominal voltages, and hence deliver high energy as well.

FIG. 1 illustrates various views of a battery or cell 10 having a housing 6, a cathode current collector 1, a cathode material 2, a spacer and/or separator 3, an anode current collector 4, and an anode material 5. An electrolyte can be dispersed in an open space throughout the battery 10 as well as saturating the cathode material 2, the separator 3, and the anode material 5. In some contexts, the combination of the cathode current collector 1 and the cathode material 2 are collectively referred to as either the cathode or the positive electrode. In some contexts, the combination of the anode current collector 4, and the anode material are collectively referred to as either the anode or the negative electrode.

As will be appreciated by one of skill in the art, and with the help of this disclosure, during the operating life of the battery, while the battery is in a discharge phase (e.g., the battery is producing energy, thereby acting as a galvanic cell), the cathode is a positive electrode and the Zn anode is a negative electrode; and while the battery is in a recharging phase (e.g., the battery is consuming energy, thereby acting as an electrolytic cell), the polarity of the electrodes is reversed, i.e., the cathode becomes the negative electrode and the Zn anode becomes the positive electrode.

As will be appreciated by one of skill in the art, and with the help of this disclosure, the number of electrodes in a secondary battery is dependent upon the desired parameters for such secondary battery. In an embodiment, the number and size of each of the electrodes (e.g., Zn anode, the cathode) in a secondary battery can be chosen based on the properties of the electrodes, such that Zn anode and cathode capacities are balanced.

In an embodiment, the housing can comprise a molded box or container, such as a thermoplastic polymer molded box (e.g., a polysulfone molded box), a thermoplastic olefin polymer molded box, or the like. As shown in FIG. 1, the electrodes may be in a prismatic geometry/configuration. While prismatic configurations are illustrated in FIG. 1, other, non-prismatic designs can also be used. For example, a cylindrical or other design can also be used with the appropriate configuration of the electrodes and separator. In some embodiments, the battery may comprise a prismatic configuration, cylindrical configuration, bi-polar configuration, or coin cell configuration.

The cathode material 2 can comprise a variety of materials that are suitable for use with a suitable anode material 5. In some embodiments, the anode material 5 can comprise zinc, and the cathode material can comprise manganese dioxide ($Zn/MnO_2$) alone or in combination with a number of additives including bismuth, copper, or derivatives thereof such as bismuth oxide, copper oxide, etc. In some embodiments, the manganese dioxide (alone or in combination with bismuth, copper, or derivative thereof), can also comprise elements such as iron, aluminum, tin, vanadium, or derivatives thereof.

In some embodiments, the cathode material 2 can comprise a mixed material comprising manganese dioxide. The mixed material can be a combination of manganese dioxide ($MnO_2$, also referred to as MD) and optional additives such as a conductive material and/or a binder. In an embodiment, conductive carbon can also be present in the cathode material 2. The mixed cathode material 2 can be based on one or many polymorphs of $MnO_2$, including electrolytic (EMD), chemically modified manganese oxide (CMD), $\alpha$-$MnO_2$, $\beta$-$MnO_2$, $\gamma$-$MnO_2$, bernessite ($\delta$)-$MnO_2$, $\varepsilon$-$MnO_2$, or λ-$MnO_2$. Discharging $MnO_2$ completely can eventually lead to the formation of the birnessite-type $MnO_2$, which exhibits a layered structure.

In some embodiments, additional metals or materials can be present in the cathode. In some embodiments, the cathode can comprise vanadium, copper, cadmium, bromide, chlorine, lithium, silver, air, sodium, compounds or salts thereof, or any combination thereof.

In some embodiments, the cathode material can comprise bismuth or a bismuth compound. The bismuth compound can be incorporated into the cathode as an inorganic or organic salt of bismuth (oxidation states 5, 4, 3, 2, or 1), as a bismuth oxide, or as bismuth metal (i.e. elemental bismuth). The bismuth compound can be present in the cathode material at a concentration between about 1 wt. % and about 20 wt %. Examples of inorganic bismuth compounds include bismuth hydroxide, bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neo-decanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yittia stabilized, bismuth-lead alloy, ammonium bismuth citrate, 2-napthol bismuth salt, duchloritri(o-tolyl)bismuth, dichlordiphenyl(p-tolyl)bismuth, triphenylbismuth, or any combination thereof.

In some embodiment, the cathode material can comprise copper or a copper compound. The copper compound can be incorporated into the cathode as an organic or inorganic salt of copper (oxidation states 1, 2, 3, or 4), as a copper oxide, as copper metal (i.e. elemental copper), or as a combination thereof. For example, the copper can be present as copper (I) oxide, copper (II) oxide, a copper hydroxide, a copper nitrate or a copper chloride, a gliding metal, cartridge brass, phosphor bronze, yellow or high brass, manganese bronze, naval brass, muntz metal, aluminium bronze, beryllium copper, free-cutting brass, nickel silver, cupronickel, ounce metal, compositional metal, gunmetal or red brass. In some embodiments, the copper can be added in the electrolyte and/or as part of the current collector (e.g., as a coating, plating, or used to form the current collector as described in more detail herein). The copper can be added in a number of forms including as a powder.

In some embodiments, the copper compound can be present in the cathode material in a concentration between about 1 wt % and about 70 wt. %, or between about 5 wt. % and about 50 wt %, between about 10 wt. % and about 50 wt %, or between about 5 wt. % and about 20 wt. %. Examples of copper compounds can include, but are not limited to, copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is believed to be the alteration of the oxidation and reduction voltages of bismuth. This results in a cathode with full or nearly full reversibility during galvanostatic cycling, as compared to a bismuth-modified $MnO_2$ which may not withstand galvanostatic cycling.

When $MnO_2$, bismuth and copper are present in the cathode material, the mass ratio of bismuth oxide to that of the $MnO_2$ can be in the range of about 0.1 to about 0.3, or between about 0.15 to about 0.25, or between about 0.18 to about 0.22. The mass ratio of bismuth oxide to copper and a conductive additive (e.g., carbon nanotubes, etc.) can be between about 0.1 to about 0.25, or between about 0.15 to about 0.2, or between about 0.16 to about 0.18.

In some embodiments, the cathode material can comprise one or more conductive metal additives. The addition of conductive metal additives to the mixed material cathode may be accomplished by the addition of metal powder to the cathode material mixture. The conductive metal additive can be present in a concentration of about 0.01 wt. % to about 30 wt. % of the cathode material. The conductive metal additive may be, for example, nickel, copper, silver, gold, tin, cobalt, antimony, brass, bronze, aluminum, calcium, iron, platinum, or any combination thereof. In some embodiments, the conductive metal additive can be in the form of a powder, a metal layer, or metal particles.

When a plurality of conductive metal additives are used, the conductive metal additives can act as a supportive conductive backbone for the first and second electron reactions to take place. The second electron reaction has a dissolution-precipitation reaction where $Mn^{3+}$ ions become soluble in the electrolyte and precipitate out on other additives such as graphite resulting in an electrochemical reaction and the formation of manganese hydroxide ($Mn(OH)_2$) which is non-conductive. This can result in a capacity fade in subsequent cycles. Suitable additional conductive metal additives can include transition metals like Ni, Co, Fe, Ti, V, and metals like Ag, Au, Al, Ca, as well as derivative thereof (e.g., salts, etc.), and any combinations thereof. Transition metals like Co may also help in reducing the solubility of $Mn^{3+}$ ions. In some embodiments, the additional conductive metal additives can be present in the form of metallic salts, which can include, but are not limited to, aluminum hydroxide, aluminum oxide, aluminum oxinate, aluminum monostearate, aluminum hydroxide hydrate, aluminum silicate, bismuth aluminate hydrate, aluminum titanate, strontium aluminate, lithium aluminate, strontium lanthanum aluminate, zinc aluminum hydroxide, magnesium aluminum hydroxide, layered double hydroxides containing aluminum and carbonates, sodium aluminate and yttrium aluminum oxide, or iron, iron hydroxide, iron hydroxide hydrate, iron oxide, manganese iron oxide, copper iron oxide, zinc iron oxide, nickel zinc iron oxide, copper zinc iron oxide, barium ferrite or alloys of aluminum and iron, tin, tin oxide, indium tin oxide, antimony tin oxide, potassium stannate hydrate, stannous hydroxide, vanadium oxide, vanadium oxytriethoxide, vanadium oxyfluoride, nickel-vanadium alloy, or any combination thereof. Such conductive metal additive(s) may be incorporated into the electrode by chemical means or by physical means (e.g. ball milling, mortar/pestle, spex mixture). An example of such an electrode can comprise about 5-95 wt. % birnessite, about 5-95 wt. % conductive carbon, about 0.01-50 wt. % of a conductive metal additive, and about 1-10 wt. % of a binder.

The cathode material 2 can comprise a conductive material such as a conductive carbon. The addition of the conductive carbon may enable high loadings of $MnO_2$ in the mixed material, resulting in high volumetric and gravimetric energy density. The conductive carbon can be present in an amount between about 2 wt. % to about 30 wt %. Such conductive carbon can include single walled carbon nanotubes, multiwalled carbon nanotubes, graphene, carbon blacks of various surface areas, graphite, and others that have specifically very high surface area and conductivity. Higher loadings of the $MnO_2$ in the mixed material electrode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB, ENASCO 150G, 210G, 250G, 260G, 350G, 150P, 250P; SUPER P, SUPER P Li, carbon black, acetylene black, single walled carbon nanotubes, multi-walled carbon nanotubes, graphene, or any combinations thereof.

In some embodiments, the cathode material 2 can include an optional binder. The binder can be present in an amount of between about 0.01 wt. % to about 10 wt. %. In an embodiment, the binder comprises a water-soluble cellulose-based hydrogel, which are used as thickeners and strong binders, and are cross-linked with good mechanical strength with conductive polymers. The binder may also be a cellulose film sold as cellophane. In some embodiments, the cellulose-based hydrogel can be a water-based cellulose that is water soluble and biocompatible and can be used as a thickener, a binding agent, a lubricant, an emulsifier, a stabilizer and a suspension aid. The cellulose-based hydrogel can include, but is not limited to, methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC).

The binders can be made by physically cross-linking the water-soluble cellulose-based hydrogels with a polymer through repeated cooling and thawing cycles. In some embodiments, a carboxymethyl cellulose (CMC) solution in an amount between about 0.01 wt. % and about 10 wt. % can be cross-linked with between about 00.01 wt. % and about 10 wt. % polyvinyl alcohol (PVA) on an equal volume basis. The binder, compared to TEFLON®, shows superior performance. TEFLON® is a very resistive material, but its use in the industry has been widespread due to its good rollable properties. In some embodiments, the binder is free of polytetrafluoroethylene (e.g., free of TEFLON). This, however, does not rule out using TEFLON® as a binder. Mixtures of TEFLON® with the aqueous binder and some conductive carbon can be used to create rollable binders.

The binder can include hydrogels (including any of those noted herein). Examples of crosslinking polymers include polyvinyl alcohol, polyvinylacetate, polyaniline, polyvinylpyrrolidone, polyvinylidene fluoride and polypyrrole. In an embodiment, a 0.01 wt. % to 10 wt % solution of water-cased cellulose hydrogen is cross linked with a 0.01 wt. % to 10% wt solution of crosslinking polymers by, for example, repeated freeze/thaw cycles, radiation treatment or chemical agents (e.g. epichlorohydrin). The aqueous binder may be mixed with between about 0.01 wt % and about 5 wt. % TEFLON® to improve manufacturability.

The cathode current collector 1 may be a conductive material to serve as an electrical connection between the cathode material 2 and the external electrical connections. In some embodiments, the cathode current collector 1 can be, for example, nickel, nickel-coated steel, nickel plated copper, tin-coated steel, copper plated nickel mesh, copper plated nickel foil, nickel plated copper mesh, nickel plated copper foil, silver coated copper mesh, silver coated copper foil, copper, magnesium, aluminum, tin, iron or a mesh with half nickel and half copper, or similar material. The cathode current collector 1 may be formed into an expanded mesh, perforated mesh, foam, foil, perforated foil, or a wrapped assembly. In some embodiments, the current collector can be formed into or form a part of a pocket assembly, as described in more detail herein.

In an embodiment, the cathode can comprise a current collector having copper and/or a salt of copper in contact with the current collector (e.g., coated, plated, covered, etc. on the current collector), and a cathode material surrounding the copper and/or the salt of copper. The cathode material can include any of the cathode materials described herein. For example, the cathode material can comprise $MnO_2$ (e.g., in any of the forms described herein), copper and/or a copper salt, bismuth and/or a bismuth salt, a binder, and a conductive carbon.

In some embodiments, the cathode material 2 can be adhered to the cathode current collector 1 by pressing at, for example, a pressure between about 100 psi and about 40,000 psi, or between about 1,000 psi and about 20,000 psi. The resulting cathode can have a porosity between about 20% and about 85%. The cathode material 2 may be adhered to the cathode current collector 1 as a paste and/or as a pre-dried sheet. A tab of each current collector extends outside of the device to provide for an electrical connection to the cathode current collector 1. In some embodiments, the tab may cover less than 0.2% of the electrode area.

In some embodiments, the cathode mixture can comprise manganese oxide ($MnO_2$) present in a concentration of between 0-95 wt. %, a copper compound present in a concentration of between 0-95 wt. %, a bismuth compound present in a concentration of between 0-95 wt. %, a conductive carbon present in a concentration of between 5-95 wt. %, and a binder present in a concentration of between 1-10 wt. %.

In some embodiments, the current collector can be copper or comprise copper and/or the current collector can be coupled to a material consisting essentially of copper and/or a salt of copper while the material is surrounded by a cathode material as described herein. For example, the surrounding cathode material can comprise $MnO_2$, a metal compound selected from the group consisting of tin, a salt of tin, aluminum a salt of aluminum, iron, a salt of iron, vanadium, a salt of vanadium and combinations thereof; a bismuth compound selected from the group consisting of bismuth and a salt of bismuth; a binder; and a conductive carbon.

In some embodiments, the anode material 5 can comprise zinc, which can be present as elemental zinc or zinc oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material 5. In an embodiment, Zn may be present in an amount of about 85 wt. %, based on the total weight of the anode material 5.

In some embodiments, ZnO may be present in an amount of from about 5 wt. % to about 20 wt. %, alternatively from about 5 wt. % to about 15 wt. %, or alternatively from about 5 wt. % to about 10 wt. %, based on the total weight of anode material 5. In an embodiment, ZnO may be present in anode material 5 in an amount of about 10 wt. %, based on the total weight of the anode material 5. As will be appreciated by one of skill in the art, and with the help of this disclosure, the purpose of the ZnO in the non-flow cell Zn anode mixture is to provide a source of Zn during the recharging steps, and the zinc present can be converted between zinc and zinc oxide during charging and discharging phases.

In an embodiment, an electrically conductive material may be present in the anode material 5 in an amount of from about 5 wt. % to about 20 wt. %, alternatively from about 5 wt. % to about 15 wt. %, or alternatively from about 5 wt. % to about 10 wt. %, based on the total weight of the anode material 5. In an embodiment, the electrically conductive material may be present in anode material 5 in an amount of about 10 wt. %, based on the total weight of the anode material 5. As will be appreciated by one of skill in the art, and with the help of this disclosure, the electrically conductive material is used in the Zn anode mixture as a conducting agent, e.g., to enhance the overall electric conductivity of the Zn anode mixture. Nonlimiting examples of electrically conductive material suitable for use in in this disclosure include carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, or any combinations thereof The anode material 5 may also comprise a binder. In an embodiment, the binder can comprise any of the binders used with the cathode material 2 as described Generally, a binder functions to hold the electroactive material particles (e.g., Zn used in anode, etc.) together and in contact with the current collector. In an embodiment, the binder may be present in anode material 5 in an amount of from about 2 wt. % to about 10 wt. %, alternatively from about 2 wt. % to about 7 wt. %, or alternatively from about 4 wt. % to about 6 wt. %, based on the total weight of the anode material 5. In an embodiment, the binder may be present in anode material 5 in an amount of about 5 wt. %, based on the total weight of the anode material 5.

In an embodiment, the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrene-sulfonate (PEDOT:PSS), polyvinyl alcohol (PVA), hydroxymethyl cellulose (HMC), carboxymethyl cellulose (CMC), and the like, or combinations thereof. In an embodiment, the binder used in a anode material 5 can comprise TEFLON, which is a PTFE commercially available from DuPont.

The anode material 5 can be coupled to the anode current collector 4, where the anode current collector 4 can include any of the current collectors described with respect to the cathode current collector 1. In general, the current collector acts as an electron carrier and a surface upon which zinc can be deposited during charging of the battery. In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, and the like, or combinations thereof. Other porous collector configurations of the current collector will be appreciated by one of skill in the art in light of this disclosure. In some embodiments, the current collector can comprise a metal collector pocketed assembly, as described in more detail herein. The anode current collector can comprise silver, bismuth, copper, cadmium, lead, iron, nickel, indium, tin, or any combinations of these metals. Other current collector configurations will be apparent to one of skill in the art, and with the help of this disclosure.

In an embodiment, the anode current collector 4 may further comprise a current collector tab. In such embodiment, the current collector tab may comprise a metal, nickel, copper, steel, and the like, or combinations thereof. Generally, the current collector tab provides a means of connecting the electrode to the electrical circuit of the battery. In an embodiment, the current collector tab is in electrical contact with an outer surface of the electrode. In an embodiment, the current collector tab is in electrical contact with less than about 0.2% of an outer surface of the electrode, alternatively less than about 0.5%, or alternatively less than about 1%.

In an embodiment, the anode material 5 may be pressed onto the anode current collector 4 to yield the anode. In an embodiment, the anode material 5 may be in the form of a dried sheet or a paste that can be pressed onto the current collector under high pressure, such as for example a pressure of from about 3,000 psi to about 10,000 psi, alternatively about 5,000 psi to about 9,000 psi, or alternatively about 6,000 psi to about 8,000 psi. In an embodiment, the anode material 5 may be pressed onto the anode current collector 4 such that the anode material 5 is in electrical contact with at least a portion of an outer surface of the anode current collector 4.

In an embodiment, the cell 10 can comprise an electrolyte that serves as an ion transporter such as an aqueous battery electrolyte or an aqueous electrolyte. In an embodiment, the electrolyte can comprises any suitable aqueous electrolyte comprising ionic conductivity and with a pH value between 1 and 14. In an embodiment, the electrolyte has a pH value of about 14, alternatively less than about 14, alternatively less than about 13, or alternatively less than about 12. In the case of rechargeable batteries, the electrolyte is important both for the active/discharging cycle of the battery (while the battery supplies a current) and for the recharging cycle when Zn may be electrodeposited to replenish the anode material.

In an embodiment, the electrolyte comprises a hydroxide such as potassium hydroxide, sodium hydroxide, lithium hydroxide, cesium hydroxide, or any combination thereof, in a concentration of from about 1 wt. % to about 50 wt. %, alternatively from about 10 wt. % to about 40 wt. %, or alternatively from about 25 wt. % to about 35 wt. %, based on the total weight of the non-flow cell electrolyte solution. In an embodiment, the electrolyte comprises potassium hydroxide in a concentration of about 30 wt. %, based on the total weight of the electrolyte within the cell 10. The non-flow rechargeable zinc-anode battery base electrolyte may comprise an acidic electrolyte, zinc sulfate or zinc chloride. The pH of the electrolyte can vary from 0-15.

In an embodiment, the cell 10 may be assembled by using any suitable methodology. In an embodiment, the cell 10 may comprise at least one anode and at least one cathode. In an embodiment, the cell 10 may comprise more than one anode and more than one cathode, wherein the anodes and the cathodes are assembled in an alternating configuration, e.g., the anodes and the cathodes are sandwiched together in an alternating manner. For example, if a cell 10 comprises two cathodes and three anodes, the electrodes would be sandwiched together in an alternating manner: anode, cathode, anode, cathode, and anode. In some embodiments, the cell 10 can be constructed with one or more anodes and one or more cathodes having a rolled configuration. For example, an anode and cathode can be layered and then rolled to create a rolled structure with a cross-section comprising an anode, cathode, anode, cathode, etc. in an alternating configuration. As will be appreciated by one of skill in the art, and with the help of this disclosure, the number of electrodes in a cell 10 is dependent upon the desired parameters for such cell 10, including consideration such as the size and properties of the electrodes, such that anode and the cathode capacities may be at least approximately balanced.

As described herein, the separator 3 forms an electrically insulating barrier between the anode and the cathode while being porous to allow for ionic flow in the electrolyte between the electrodes. By being placed between the electrodes, the separator 3 serves to prevent shorting that could occur due to direct electrical contact between the electrodes. As will be appreciated by one of skill in the art, the separator 3 allows the electrolyte, or at least a portion and/or component thereof, to pass (e.g., cross, traverse, etc.) through the electrode separator membrane, to balance ionic flow and sustain the flow of electrons in the battery. In this regard, the separator 3 serves to demarcates the cathode from the anode.

The separator 3 may comprise one or more layers. Suitable layers can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified polyolefin" refers to a polyolefin whose contact angle with water is less than 45°. In another embodiment, the contact angle with water is less than 30°. In yet another embodiment, the contact angle with water is less than 20°. The polyolefin may be modified by, for example, the addition of TRITON X-100™ or oxygen plasma treatment. In some embodiments, the separator 3 can comprise a CELGARD® brand microporous separator. In an embodiment, the separator 3 can comprise a FS 2192 SG membrane, which is a polyolefin nonwoven membrane commercially available from Freudenberg, Germany.

The layers can be present in a variety of configurations. In some embodiments, one or more of the layers can be wrapped around the anode and/or cathode. In some embodiments, a multi-layer structure can be used between the electrodes, where a portion of any one or more of the layers can optionally extend around one or more of the electrodes.

In some embodiments, the separator layer 3 can comprise one or more spacers that can be used to physically separate the electrodes in the secondary battery. In an embodiment, the spacers may comprise materials which (i) are chemically stable in the electrolyte solution and (ii) have high electrical resistance. Nonlimiting examples of materials suitable for use in the spacers include nylon, acrylonitrile-butadiene-styrene copolymers (ABS), PTFE, acrylic polymers, polyolefins, and the like. The spacers can be present as films (e.g., thereby forming separator layers), or the spacers can comprise other structures such as rings, perforated plates, cells, or the like to physically separate the anode and cathode while allowing for the electrolyte to communicate between the anode and cathode.

In an embodiment, the secondary battery can comprise a flow-assisted secondary battery. In this configuration, the electrolyte can be disposed within the housing to freely flow between the anode(s) and/or the cathode(s). The flow-assisted secondary battery can comprise a housing, an anode, a cathode, and an electrolyte solution, where the Zn anode, the cathode, and the electrolyte solution may be located inside the battery housing. In some embodiments, the anode, the cathode, and/or the electrolyte can comprise any of the anode materials, cathode materials, and/or electrolyte materials described herein with respect to the non-flow secondary battery. As with the batteries described herein, the flow-assisted rechargeable zinc-anode battery may comprise a prismatic configuration, cylindrical configuration, bi-polar configuration, or coin cell configuration. The flow-assisted rechargeable zinc-anode battery comprises an anode current collector and the current collector may have a flat surface or cylindrical dimension. The anode current collector can be silver, bismuth, copper, cadmium, lead, iron, nickel, indium and tin and combinations of these metals.

The flow-assisted battery housing is configured to contain the anode(s), the cathode(s), and the electrolyte solution and provide for a flow path for the circulation of the electrolyte solution with respect to the anode(s) and cathode(s). In an embodiment, the battery housing comprises a molded box or container that is generally non-reactive with respect to the electrolyte solution. In an embodiment, the housing comprises a polypropylene molded box, an acrylic polymer molded box, or the like.

The batteries described herein can be operated by discharging and charging the cells a plurality of times. The cells can be operated in a variety of modes such as a capacity limited charge and discharge protocol, voltage controlled charge and discharge protocols, and the like at a variety of C rates. As used herein, a C-rate is a measure of the rate at which a battery is discharged relative to its maximum capacity. A 1 C rate means that the discharge current will discharge the entire battery in 1 hour, whereas a C/2 rate would discharge the entire battery in 2 hours. In some embodiments, the discharge cycles can access a portion of the second electron capacity of the $MnO_2$. The cells as described herein can maintain a ratio of an initial capacity to an operating capacity of at least about 80%, at least about 90%, or at least about 95% over at least 100 cycles, at least 150 cycles, at least 200 cycles, or at least about 250 cycles. As used herein, each cycle comprises a charge and discharge of the cell, and the initial capacity can be the peak capacity measured after the first or second cycle.

In order to improve the ability to access the capacity of a cell comprising $MnO_2$, a process for limiting the negative effects of zincate ions on the $MnO_2$ can be used to improve the performance of the cell. In addition to the composition changes described herein, a pocket assembly can be used to contain the cathode and limit the interaction of the zincate ions with the cathode material.

Figure 2A:
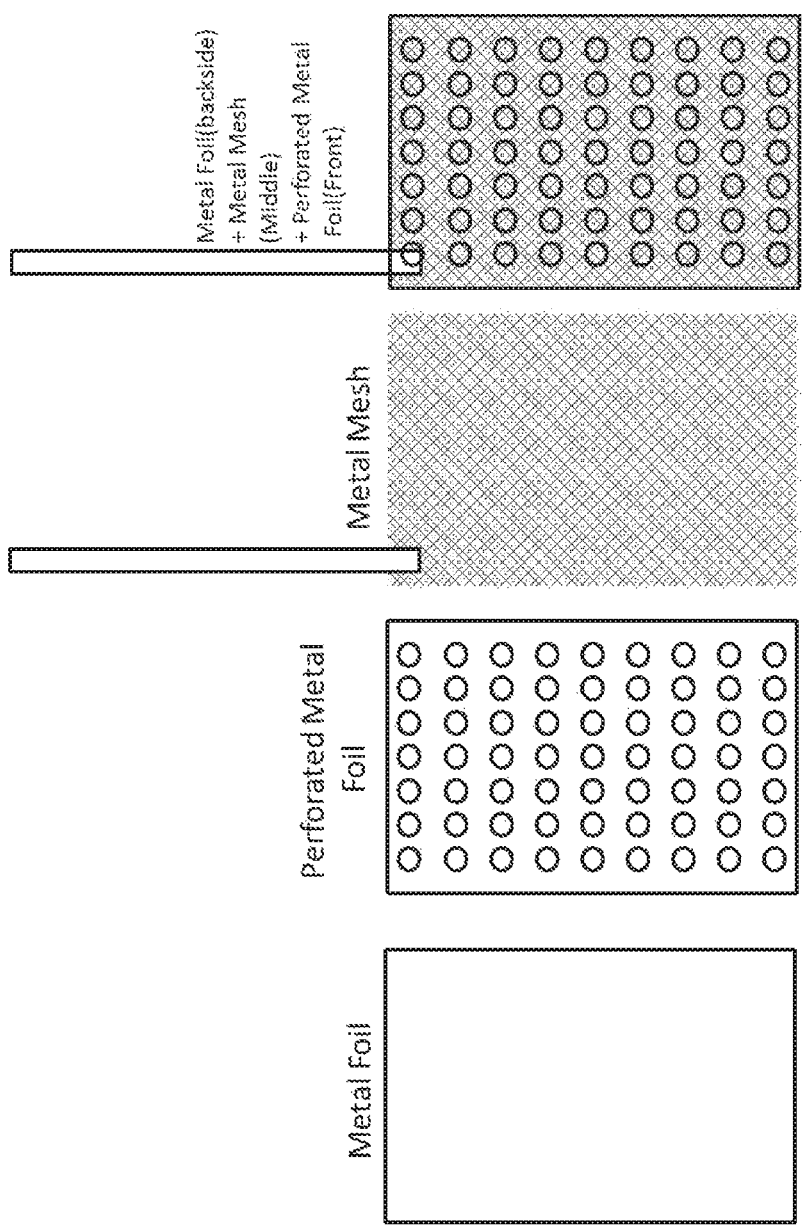
FIGS. 2A-2D illustrate schematic diagrams showing the individual components of a perforated pocketed electrode design according to some embodiments.
Figures 2B, 2C, 2D:
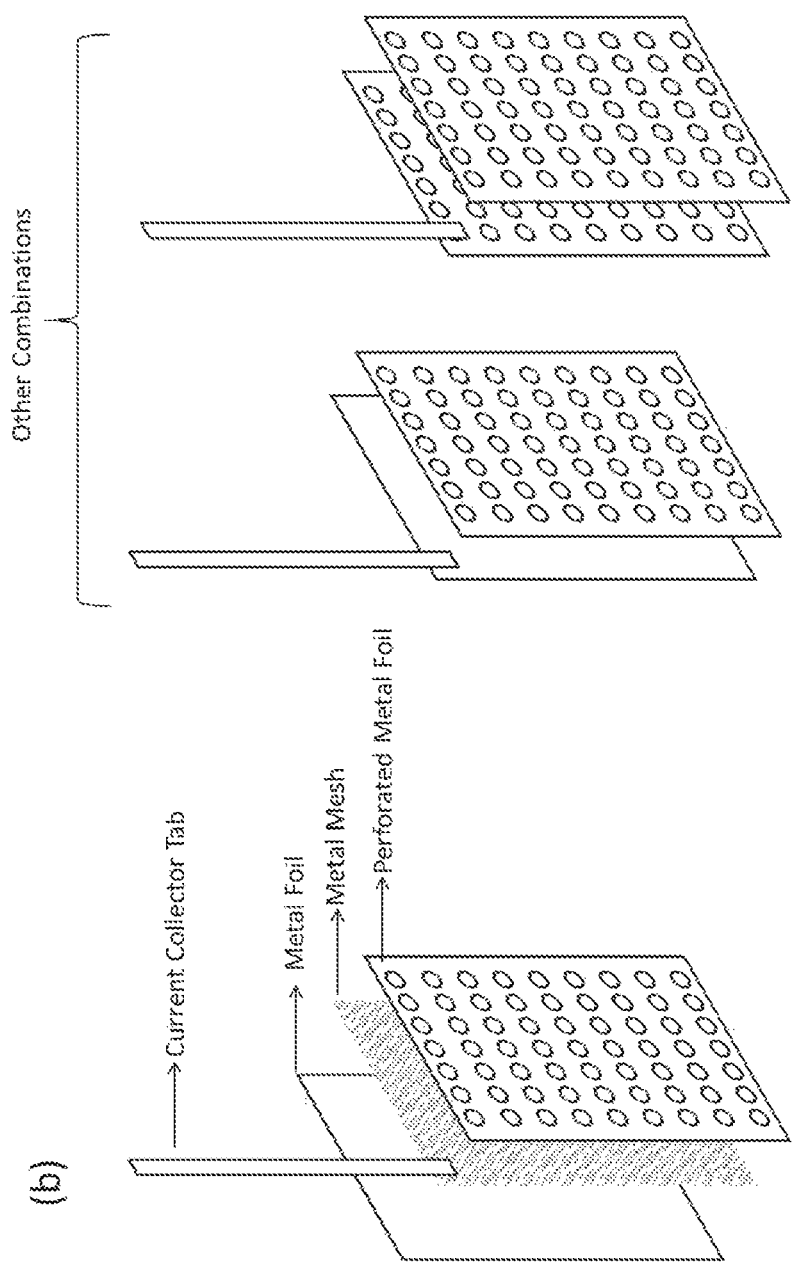

In some embodiments, a pocket assembly can be used to form a pocket cathode. As shown in FIGS. 2A-2D, a pocket assembly 200 can comprise at least two sheets 202, 204 of material enclosing an electrode material such as a cathode material 2. In the embodiment as shown in FIGS. 2A and 2B, at least one sheet can comprise a solid metal foil 202, and an opposite sheet can comprise a permeable foil 204. The solid foil can serve as a barrier for zincate ions to reduce the negative effects of the zincate ions on the manganese dioxide. The permeable foil can be formed as a perforated sheet of foil, a mesh, an expanded mesh, a foam, or any combination thereof. The perforations or permeable layer can be placed on the side of the cathode facing the anode. The permeable foil can be selected to not have or to only have a limited effect in terms of the rate of ionic conductivity between the electrolyte and the cathode material. For example, the permeability and/or area of the perforations can be selected to allow the electrolyte to interact with the $MnO_2$ within the pocket assembly 200.

The cathode material 2 can be disposed between the two sheets 202, 204. In some embodiments, an optional additional sheet 206 such as a metal mesh can be used between the outer sheets 202, 204. A current collector tab 208 can be electrically coupled to either sheet 202, 204 and/or the optional central mesh 206. The cathode mixture can be pasted and pressed on the metal mesh collector 206 and then be pocketed with the metal foil 202 at the back and perforated metal foil 204 at the front. The collectors can be coupled together to hold the cathode material 2 firmly. For example, the collectors can be welded, crimped, rolled, or otherwise electrically coupled together on the edges to enclose the cathode material within a pocket. Once the collectors are electrically coupled, the current collector tab 208 can be electrically coupled to each sheet or foil in the pocket assembly 200, thereby providing a good electrical connection between the sheets and the cathode material, where the sheets can serve as current collectors for the electrode.

FIGS. 2C-2D illustrate additional alternative configurations. For example, FIG. 2C illustrates an embodiment comprising a solid foil sheet 202 coupled to a perforated front foil sheet 204 without any intervening metal mesh. The cathode material can be disposed between the sheets 202 and 204 and encapsulated upon coupling of the solid foil sheet 202 to the perforated foil sheet 204. FIG. 2D illustrates an embodiment in which both foil sheets 202 and 204 are perforated to provide access between the electrolyte in the cell and the cathode material encapsulated between the two sheets 202, 204. While generally illustrated as having two or three layers, different or additional layers could also be present. For example, the outside layer could comprise a metal mesh (e.g., without a perforated metal foil), or multiple metal mesh layers could be present between two perforated foils or one perforated foil layer with one solid foil layer.

In some embodiments, any of the metal foils 202, 204 and/or metal mesh layers can be plated with copper and/or contain copper. For example, any of the metal foils 202, 204 and/or the metal mesh or foam layer(s) 206 can comprise a copper containing material or a copper plated material such as plated nickel, plated nickel plated on steel, plated iron, plated aluminum, gliding metal, cartridge brass, phosphor bronze, yellow or high brass, manganese bronze, naval brass, muntz metal, aluminium bronze, beryllium copper, free-cutting brass, plated nickel silver, cupronickel, plated tin, plated tin coated steel, plated silver coated steel ounce or compositional metal and gunmetal or red brass. In some embodiments, the sheets or foils can be formed from copper, and optionally plated or coated with another metal such as nickel.

When a material that is plated with copper is used, the copper can be plated on the metal by bright acid plating, flash copper plating, alkaline-complexed bath, acid-complexed bath, mildly alkaline-complexed bath, or the like. The plating can occur for a duration of between about one minute and twenty four hours. The copper plating can be in a form other than elemental copper such as the plating of an alloy such as brass or bronze on the metal.

In some embodiments in which copper plating or a copper containing compound is plated on the pocket assembly, the plating can cover the entire metal surface of the pocket assembly, an inner surface of the pocket assembly, an outer surface of the pocket assembly, or only a portion of the inner surface and/or the outer surface of the pocket assembly. In some embodiments, an outer surface of the pocket assembly facing the anode in the final cell construction can be at least partially or completely coated with copper or a copper containing material.

The cathode material used with the pocket assembly 200 can include any of the cathode materials described herein, including any of the mixtures used herein. In some embodiments, the cathode material can comprise $MnO_2$ in any of the forms described herein, a bismuth compound, a conductive carbon, or any combination thereof. As the cathode material can be captured within the pocket assembly, the pocket assembly may support the cathode material. In this instance, a binder may not be used with the cathode material in the pocket assembly. This may allow the cathode to be less expensive and easier to manufacture, while also allowing the cathode to carry more of the active material in the cathode. In some embodiments, the cathode material may not comprise copper as the copper can be included within one or more layers of the pocket assembly and/or coated on one or more surfaces of the layers of the pocket assembly. In some embodiments, the copper can be present both on or as part of the layers of the pocket assembly as well as being included within the cathode material and/or the electrolyte.

In some embodiments, the pocket assembly can be constructed in a similar fashion and contain anode material rather than cathode material. The pocket assembly using the anode material can then serve as the anodes in the cell. The construction of an anode using the pocket assembly can be the same or similar to any of the configurations shown and described with respect to FIGS. 2A-2D. The anode material within the pocket assembly can comprise any of the anode materials described herein. In some embodiments, only one of the cathode or the anode may be disposed in a pocket assembly, while in other embodiments, both the anode and cathode can be disposed in pocket assemblies separated by a separator and/or spacer. A cell using a pocket assembly can otherwise be constructed and operated according to any of the embodiments described herein (e.g., any of the embodiments described with respect to FIG. 1).

The use of the pocket assembly to contain the cathode and/or anode material may provide benefits to the performance of the cell. In some embodiments, the energy efficiency of a cell comprising a cathode material disposed in a pocket assembly can be greater than about 55%, greater than about 60%, greater than about 65%, or greater than about 70%, which is higher than cells having a mesh type design where the energy efficiency is usually around 50-55%.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

The electrodes in examples 1-4 were compressed with nickel anodes in a prismatic box. A mercury/mercury oxide reference electrode was used to monitor the potentials of the hybrid or copper electrodes. The birnessite electrode was cycled galvanostatically between 0.3V and −1V versus the reference under a capacity limited protocol or a voltage limited protocol.

Example 1

The following example provides details relating to the composition, fabrication and performance characteristics $MnO_2$ batteries. It should be understood the following is representative only, and that the invention is not limited by the detail set forth in these examples.

In one example, 29.22 wt. % of birnessite-type or EMD-type $MnO_2$ was mixed with bismuth oxide, copper, and carbon nanotubes till the mixture was homogeneous. The mass ratio of bismuth oxide to that of EMD was around 0.2, while that of bismuth oxide to copper and carbon nanotubes was around 0.17. CMC-PVA covered the balance of the electrode mixes. The electrode mixes were pasted on a nickel mesh that functioned as a current collector, pressed and dried. These electrodes were cycled galvanostatically at C/3 and 1 C in 25% and 37% KOH, respectively.

In FIGS. 3 and 4, results relating to the cells containing material from example 1 are presented. FIGS. 3A and 3C show the effect of rate on the voltage-time curves in 37% KOH for the first 5 cycles at C/3 rate. The voltages relating to a cell containing zinc anode are shown on the right hand side of the plot. The cells are operated on a capacity limited charge and discharge protocol. If the capacity is limited about 280 mAh/g (including the copper and manganese dioxide weights) the cells are able to easily obtain that capacity without any degradation in performance irrespective of the rates used (FIGS. 3B and 3D). Also, the voltage-time curves show that at low rates of C/3 almost the full capacity can be obtained about 0.8V against Zn while that for 1 C it is a little bit below 0.8V against Zn due to polarization. The plateaus seen in the voltage-time curves seem to suggest a dissolution-precipitation reaction taking place in the hybrid electrodes. Also, the cells seem to get its full charge capacity well below the limit of 0.3V that was set for cell operation. Similar results can be seen for the cells operating in 25% KOH as shown in FIGS. 4A-4D. The plateaus are shifted to more positive potentials due to the change in pH at lower KOH concentrations. The charge and discharge capacity plots at 1 C (FIG. 4D) show that it can obtain the full capacity without any fade (these cells were also run with a capacity limit of ~280 mAh/g). However, at C/3 rate there is a slight decrease in discharge capacity initially but there is an upward trajectory where it seems to be going to the full charge capacity. The slight decrease in its initial cycles could be due to a charge transfer resistance caused by the low ionic strength of the electrolyte.

Figures 5A, 5B:
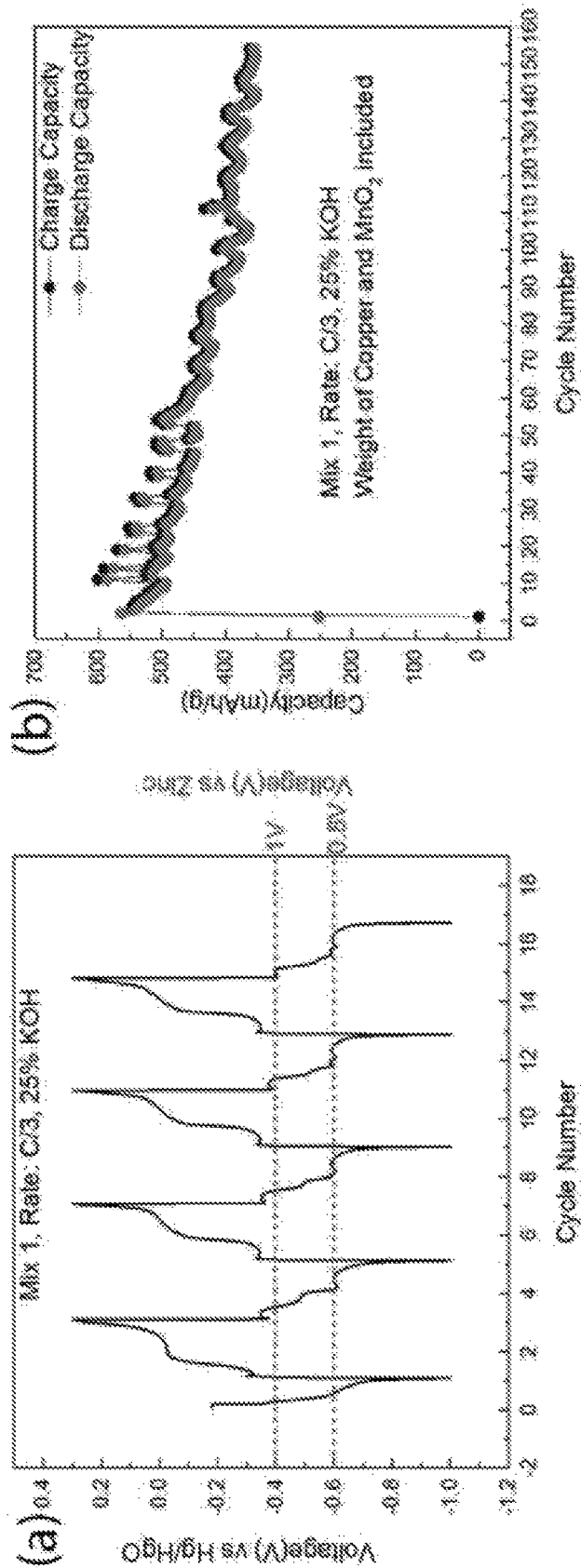
FIG. 5A illustrates voltage-time curves for the battery described with respect to Example 1 for the first 5 cycles at C/3 in 25% KOH electrolyte.
FIG. 5B illustrates charge and discharge capacity for the battery described with respect to Example 1 at C/3 in 25% KOH.

In FIGS. 5A-5B, results relating to a cell containing material from example 1 are presented. The cell was operated on a voltage controlled charge and discharge protocol at C/3. The cell behavior is different compared to a cell operating on a capacity limited protocol (FIG. 4A). The cell behavior on charge is a sloping voltage curve indicating the possibility of a solid state charging process. The cell delivers most of its discharge capacity about 0.8V against Zn. The cell operated at about 98% columbic efficiency with minimal fade. The fade in capacity for a voltage controlled compared to a capacity limited protocol suggests the detrimental mechanistic effect when the cell is charged to its limit of 0.3V against the reference. Thus, electrodes containing a hybrid mix like example 1 can be made rechargeable and be shown to achieve higher charge and discharge capacities and energy consistently depending on the method of cell operation. This represents a major breakthrough in the field of alkaline batteries.

Example 2

In a second example, 29.22 wt. % of birnessite-type or EMD-type $MnO_2$ was mixed with copper, and carbon nanotubes till the mixture was homogeneous. The mass ratio of CMC-PVA to that of EMD and carbon nanotubes was around 0.22, while that of CMC-PVA to copper was around 0.19. CMC-PVA covered the balance of the electrode mixes. The electrode mixes were pasted on a nickel mesh, pressed and dried. These electrodes were cycled galvanostatically at 1 C in 37% KOH.

Figure 6A:
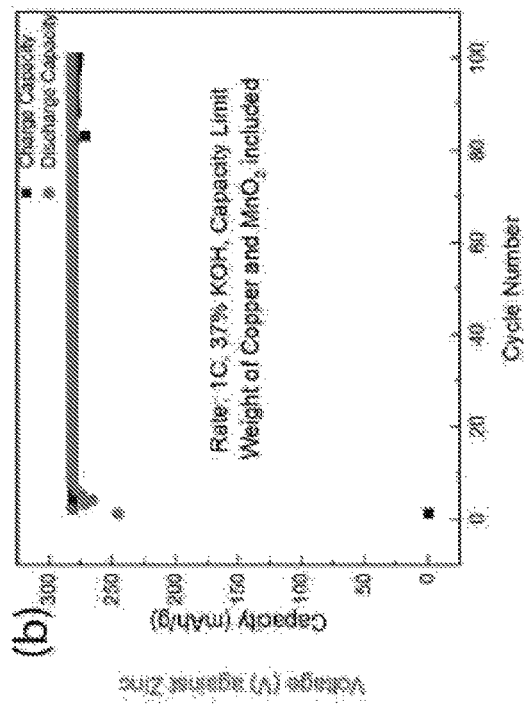
FIG. 6A illustrates voltage-time curves for the battery described with respect to Example 2 for the first 5 cycles at C/3 in 37% KOH electrolyte.
Figure 6B:
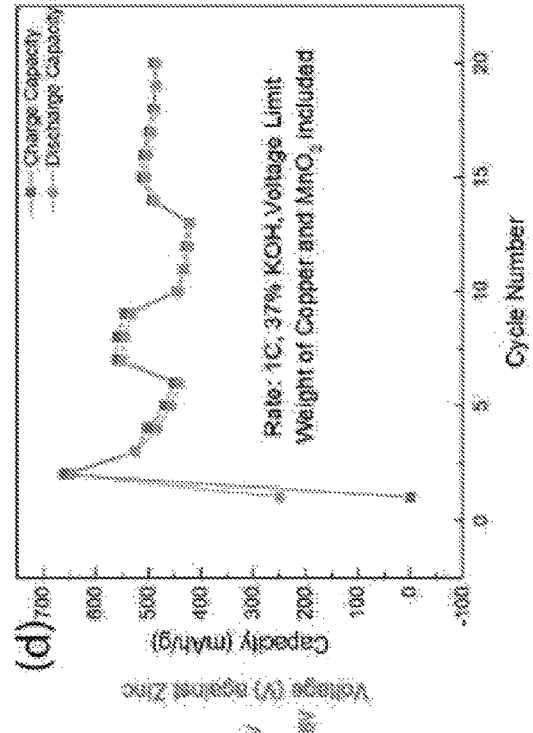
FIG. 6B illustrates a chart showing charge and discharge capacity for the battery described with respect to Example 2 at C/3 in 37% KOH.
Figure 6C:
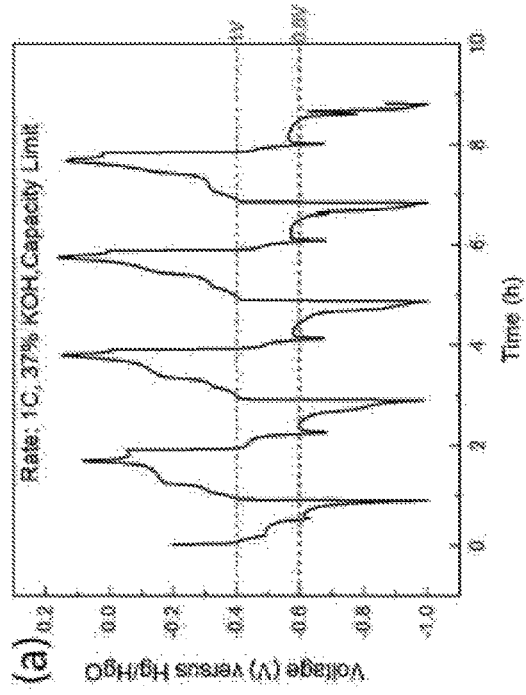
FIG. 6C illustrates voltage-time curves for the battery described with respect to Example 2 for the first 5 cycles at 1 C in 37% KOH electrolyte.
Figure 6D:
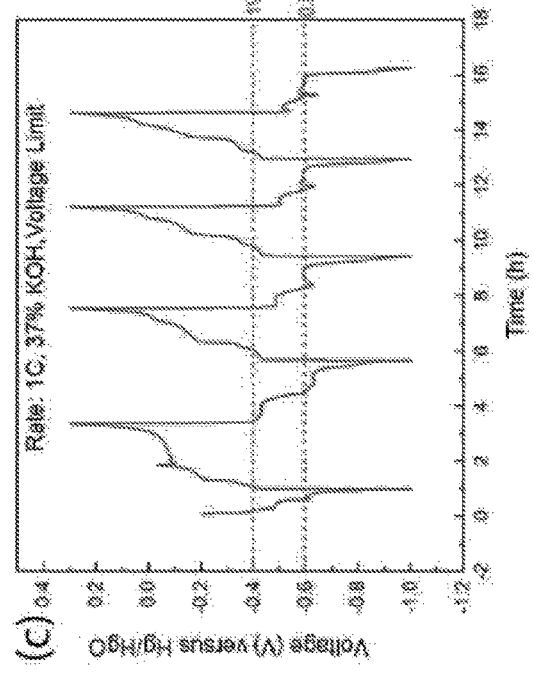
FIG. 6D illustrates a chart showing Charge and discharge capacity for the battery described with respect to Example 2 at 1 C in 37% KOH.

In FIGS. 6A-6D, results relating to cells containing material from example 2 are presented. The cells were run at 1 C charge and discharge rates in 37% KOH. FIGS. 6A and 6B present data from cells operated under capacity limited charge and discharge protocols while FIGS. 6C and 6D present data from cells operated under voltage controlled charge and discharge protocols. The absence of bismuth oxide in the mix leads to interesting voltage-time curves for both protocols. In the capacity limited protocol (FIG. 6A) there is a loss of the plateau about −0.4V versus the reference. However, the cell is able to obtain full charge and discharge capacity as shown in FIG. 6B. Somewhat similar trend is obtained in the voltage controlled protocol. A good portion of the capacity is obtained near −0.5 to −0.6V against the reference. The trend in charge and discharge capacity is similar to FIGS. 5A-5D, after 20 cycles the discharge capacity is about 500 mAh/g. It seems from this example that bismuth oxide plays an important role in maintaining high energy efficiency.

Example 3

In a third example, copper powder and carbon nanotubes were mixed till the mixture was homogeneous. The ratio of copper to carbon nanotubes was 1. Copper comprised 45% of the mix. CMC-PVA covered the balance. The electrodes were pasted on a nickel mesh, pressed and dried. The electrodes were cycled galvanostatically in 37% KOH.

Figure 7A:
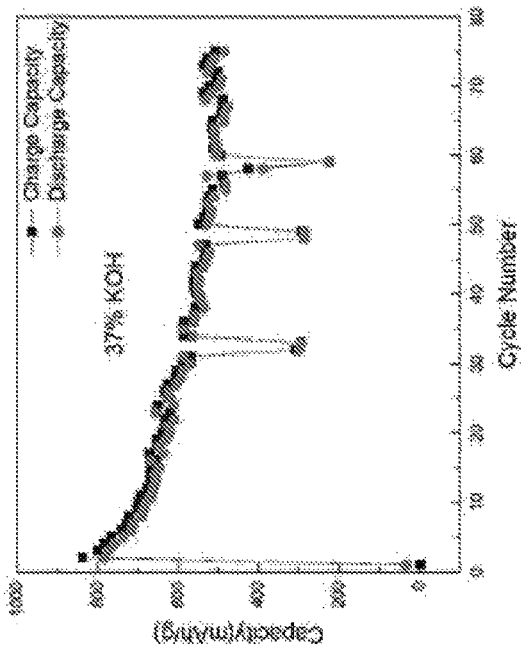
FIG. 7A illustrates voltage-time curves for the battery described with respect to Example 3 for the first 5 cycles at C/3 in 37% KOH electrolyte.
Figure 7B:
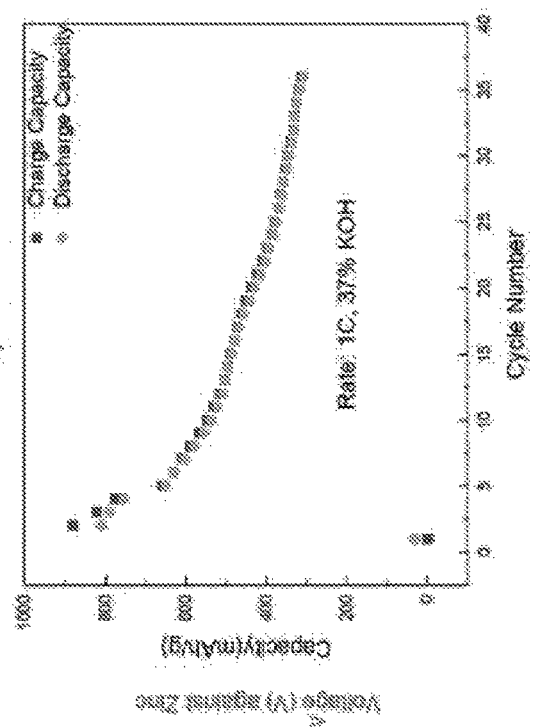
FIG. 7B illustrates a chart showing charge and discharge capacity for the battery described with respect to Example 3 at C/3 in 37% KOH.
Figure 7C:
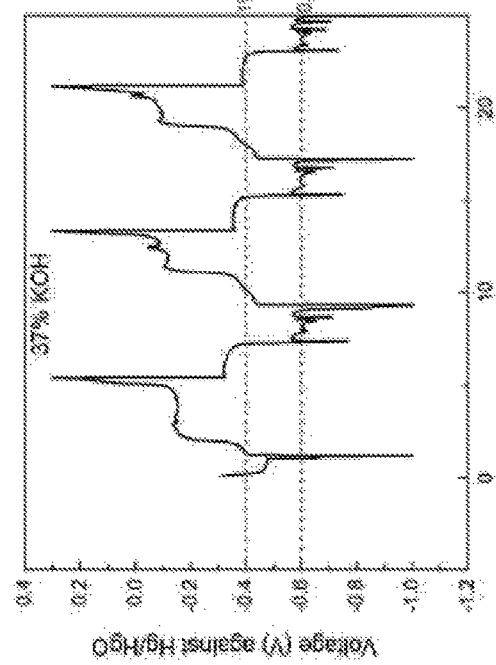
FIG. 7C illustrates voltage-time curves for the battery described with respect to Example 3 for the first 5 cycles at 1 C in 37% KOH electrolyte.
Figure 7D:
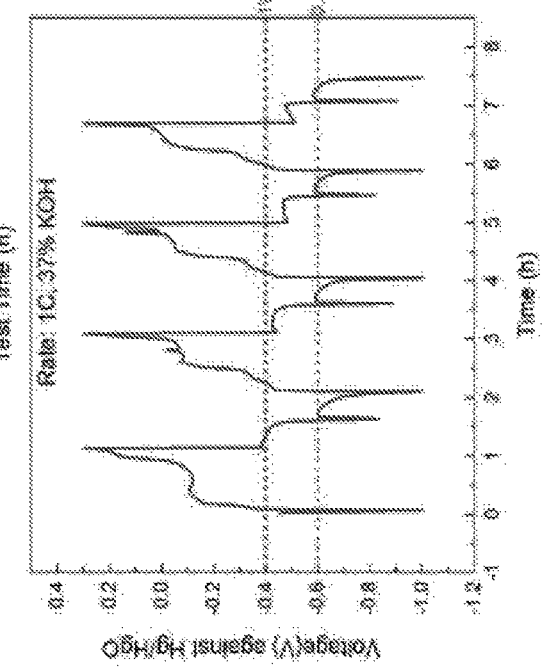
FIG. 7D illustrates a chart showing charge and discharge capacity for the battery described with respect to Example 3 at 1 C in 37% KOH.

In FIGS. 7A-7D, results relating to cells containing material from example 3 are presented. The cells were operated under a voltage controlled charge and discharge protocol in 37% KOH. A very high capacity of about 800 mAh/g is obtained from the cells containing only copper as shown in FIG. 7B. In FIG. 7A the entire capacity is obtained by about 0.8V against Zn which makes it a good cathode. There is a slight fade but even after 75 cycles the capacity is about 500 mAh/g which makes it a good cathode for copper-zinc cells. Also, this demonstrates a traditional primary battery can be rechargeable in alkaline electrolyte. It also shown to work at higher charge discharge rates in FIGS. 7C and 7D. The fade is a bit more drastic but still it is a rechargeable cell.

Example 4

Figure 8B:
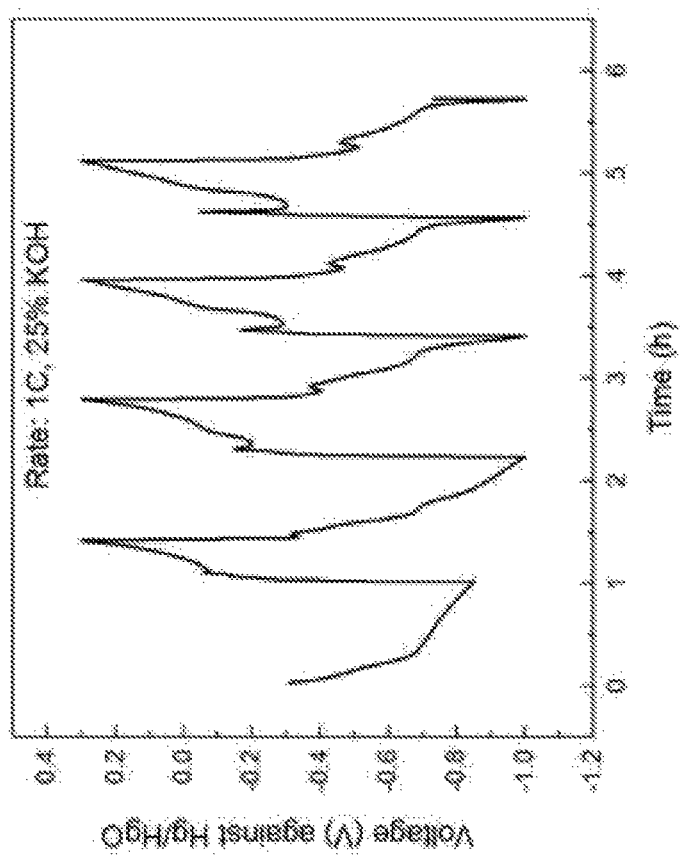
FIG. 8B illustrates a chart showing charge and discharge capacity for the battery described with respect to Example 4 at 1 C in 25% KOH.
Figure 8A:
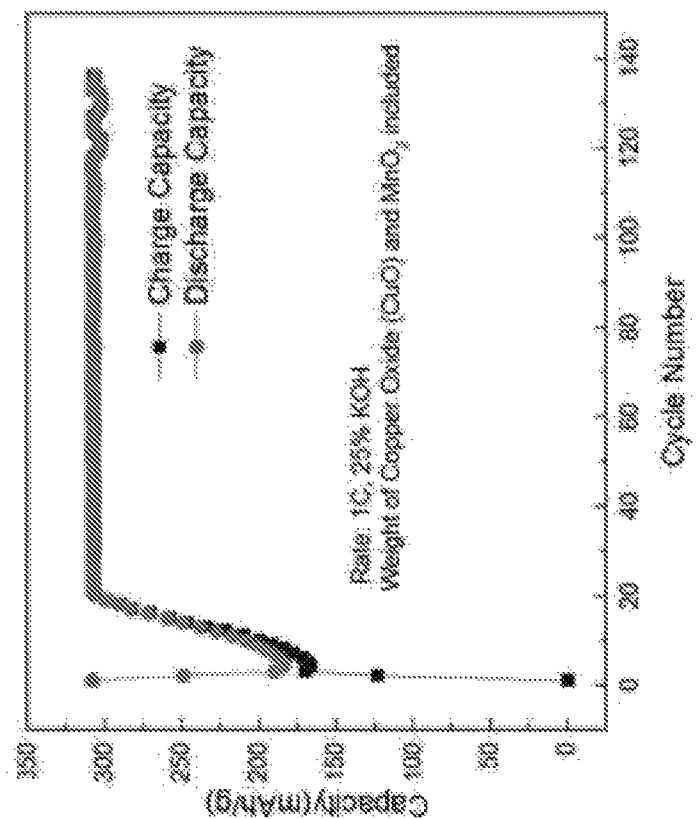
FIG. 8A illustrates voltage-time curves for the first 5 cycles for the battery described with respect to Example 4 at 1 C in 25% KOH.

In another example, 29.22 wt. % of birnessite-type or EMD-type $MnO_2$ was mixed with bismuth oxide, copper oxide (CuO), and carbon nanotubes till the mixture was homogeneous. The mass ratio of bismuth oxide to that of EMD was around 0.2, while that of bismuth oxide to copper oxide and carbon nanotubes was around 0.17. CMC-PVA covered the balance of the electrode mixes. The electrode mixes were pasted on a nickel mesh that functioned as a current collector, pressed and dried. These electrodes were cycled galvanostatically at 1 C in 25% KOH, respectively. FIGS. 8A and 8B show the cycling results of this cell. The cell is able to obtain ~300 mAh/g (mass of CuO and $MnO_2$ included) with ~100% coulombic efficiency for >130 cycles.

Example 5

In this example, 50 wt. % of birnessite-type or EMD-type $MnO_2$ was mixed with bismuth oxide and carbon nanotubes till the mixture was homogeneous. The mass ratio of bismuth oxide to that of EMD was around 0.4. Water was used to make the electrode mixes and were enclosed in a pocket assembly and compressed at 10000 psi. The pocket assembly was either created with nickel foam or a nickel foil with copper plated on it. These electrodes were cycled galvanostatically at C/3 in 25% KOH, respectively.

The electrodes in the example were compressed with zinc anodes in a prismatic box, respectively. Cellophane was used as the separator between the two electrodes. Electrode sizes are 2 by 3 inches. The birnessite electrode was cycled galvanostatically at C/3 between 1.75V and 0.3V versus the zinc anode under a capacity limited protocol or a voltage limited protocol.

FIGS. 9A-9D present the results of a foam pocketed design electrode. FIG. 9A shows the first five charge and discharge cycles of the cell. The cell achieves the complete second electron capacity well within the limits of the maximum and minimum voltage. Also, the cell delivers most of the capacity out at high voltages which translates to high energy. This is more noticeable in FIGS. 9B and 9C. The voltage versus discharge and charge curves are shown in FIGS. 9B and 9C, respectively. Cycles 1, 5, 50 and 70 are shown to compare cell behavior in early cycle and late cycle life. In FIG. 9B, there is some variation in cycle behavior from cycles 1 and 5 to cycles 50 and 70. Cycles 50 and 70 have similar discharge curves which indicate that the cell performance stabilizes. An important characteristic is that majority of the cell's maximum energy is delivered by 0.6V against zinc. Another important characteristic of the cell is the consistent performance in delivering the complete second electron after 75 cycles (FIG. 9D) without the deleterious effect of the zinc on the manganese oxide. This demonstrates that these cells are not affected by zinc and the cell behavior is consistent in later cycle life as well. Energy efficiency is around 60% which is higher compared to cells having a mesh type design where the energy efficiency is usually around 50-55%. This example demonstrates the importance of copper in aiding the manganese dioxide in achieving the full second electron, and the cell design demonstrates the importance of incorporating the electrode material in the cell in innovative ways so that it plays a vital role in increasing the energy efficiency as well. The presence of copper on the surface of the foam could play a role in interacting with the zinc to form a complex before the zinc interacts with the manganese dioxide to deteriorate its performance. This is seen with the reproducibility of the voltage discharge curves in later cycles which would not be the case in the standard mesh design.

Figure 10B:
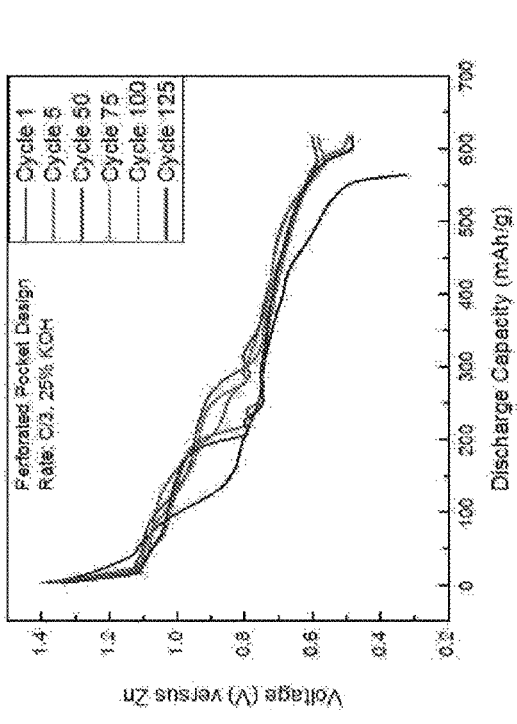
FIG. 10B illustrates perforated pocket design discharge curves for the battery described with respect to Example 5 for different cycles at C/3 in 25% KOH.
Figure 10D:
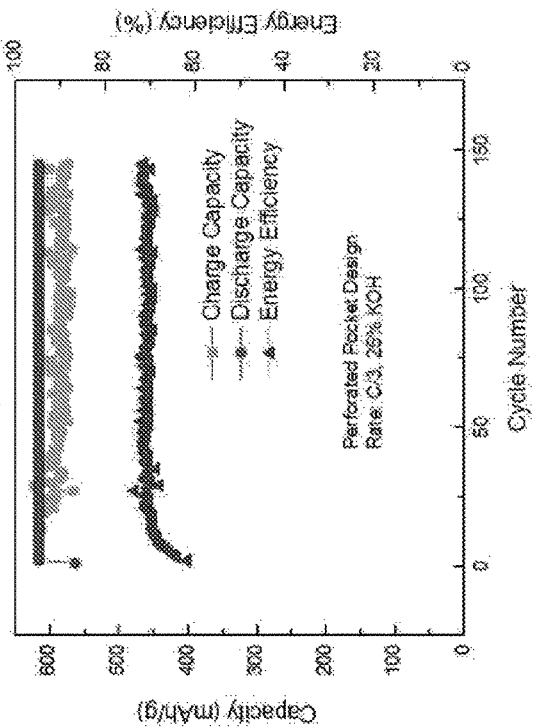
FIG. 10D illustrates perforated pocket design capacity and energy efficiency versus cycle number for the battery described with respect to Example 5 at C/3 in 25% KOH.
Figure 10A:
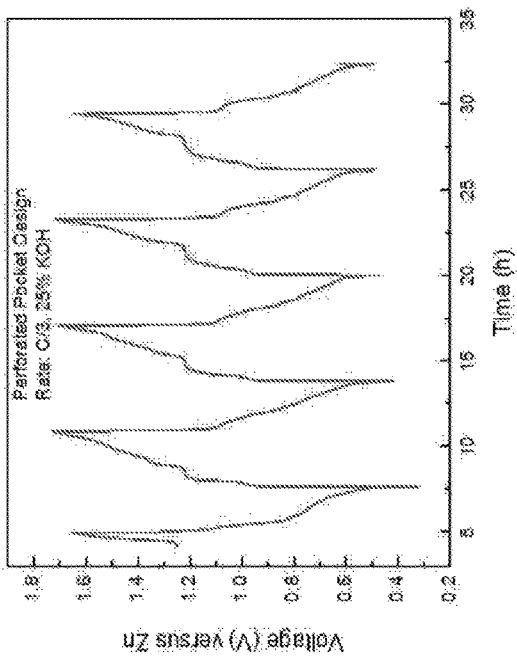
FIG. 10A illustrates perforated pocket design voltage-time curves for the battery described with respect to Example 5 for the first 5 cycles at C/3 in 25% KOH electrolyte.
Figure 10C:
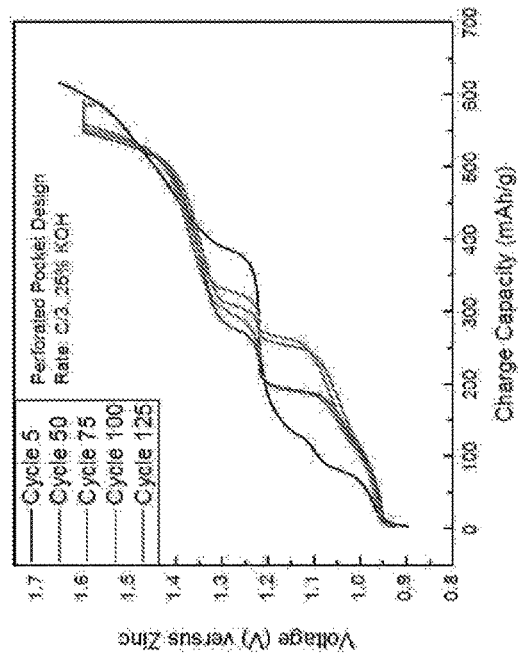
FIG. 10C illustrates perforated pocket design charge curves for the battery described with respect to Example 5 for different cycles at C/3 in 25% KOH electrolyte.

FIGS. 10A-10D present results about the perforated design pocket electrodes. Perforated foils were tried as they are much cheaper than foams. Also, a solid foil would be a substantially complete barrier for zincate ions to prevent them from negatively affecting the manganese dioxide. There is no negative effect in terms of rate or ionic conductivity as the perforations allow the electrolyte to interact with the manganese dioxide. FIG. 10A shows the voltage-time curves for the first five cycles and the difference is immediately noticeable between the foam and perforated designs. The perforated cells have a much better performance as they are able to achieve the complete second electron well within the limits of the maximum and minimum voltage. FIGS. 10B and 10C show the voltage versus discharge and charge curves at various cycles, respectively. FIG. 10B shows the superior performance of the perforation design as all of the capacity is obtained at higher voltages in early and much later cycle life with great reproducibility.

This shows that zincate has no effect (or only a limited effect) on the performance of the cells. The same can be noticed on the charge curves in FIG. 10C. Two plateau processes can be seen which are seen in traditional birnessite curves as well. In later cycles a constant voltage (CV) step was added at 1.6V to test its effect on cell performance. It had no detrimental effect. FIG. 10D shows the capacity and energy efficiency of the cell. The cell is able to deliver the complete discharge capacity with ease by 0.6V. The charge capacity is slightly less than the discharge capacity as the end of charge voltage is cut off at 1.6V. The CV step helps it get close to the complete second electron. The energy efficiency is around 72% by 150 cycles, which is higher than previously achieved for birnessite-zinc cells. It is around 12% greater than the foam design and around 15-20% greater than the standard mesh design cells. This represents an improvement in the second electron rechargeable alkaline cells. The new electrode designs show the novelty and breakthrough performance in not only delivering second electron capacity with no fade at very high energy efficiency. Another great advantage of these designs is the elimination of binder and fast and cheap processing for large scale manufacturability.

Having described various devices and processes herein, specific embodiments can include, but are not limited to:

In a first embodiment, a secondary alkaline battery comprises: an anode; a cathode comprising:

a current collector contacting the electrode; an electrode that consists essentially of a copper or a salt of copper, the electrode surrounded by a composition of matter comprising: manganese oxide ($MnO_2$); a copper compound selected from the group consisting of copper and a salt of copper; a bismuth compound selected from the group consisting of bismuth and a salt of bismuth; a binder; and a conductive carbon.

A second embodiment can include the battery of the first embodiment, wherein the manganese oxide ($MnO_2$) is selected from the group consisting of electrolytic manganese dioxide (EMD), chemically modified manganese oxide (CMD), birnessite ($\delta$) $MnO_2$, alpha ($\alpha$) $MnO_2$, beta ($\beta$) $MnO_2$, epsilon ($\epsilon$) $MnO_2$, lambda ($\lambda$) $MnO_2$, and gamma ($\gamma$) $MnO_2$.

A third embodiment can include the battery of the first or second embodiment, wherein the copper compound is copper (I) oxide, copper (II) oxide, a copper hydroxide, a copper nitrate or a copper chloride, a gliding metal, cartridge brass, phosphor bronze, yellow or high brass, manganese bronze, naval brass, muntz metal, aluminium bronze, beryllium copper, free-cutting brass, nickel silver, cupronickel, ounce metal, compositional metal, gunmetal or red brass.

A fourth embodiment can include the battery of any of the first to third embodiments, wherein the copper compound is present in the composition of matter as a powder.

A fifth embodiment can include the battery of any of the first to fourth embodiments, wherein the bismuth compound is a bismuth oxide, a bismuth hydroxide, a bismuth nitrate, a bismuth chloride.

A sixth embodiment can include the battery of any of the first to fifth embodiments, wherein the bismuth compound is present in the composition of matter as a powder.

A seventh embodiment can include the battery of any of the first to sixth embodiments, wherein the binder is a water-based binder.

An eighth embodiment can include the battery of any of the first to seventh embodiments, wherein the binder is free of polytetrafluoroethylene.

A ninth embodiment can include the battery of any of the first to seventh embodiments, wherein the binder is mixed with polytetrafluoroethylene.

A tenth embodiment can include the battery of any of the first to ninth embodiments, wherein the binder is a cellulose-based hydrogel that is cross-linked with a polymer.

An eleventh embodiment can include the battery of the tenth embodiment, wherein the cellulose-based hydrogel is a water-based cellulose that is water soluble and biocompatible and can be used as a thickener, a binding agent, a lubricant, an emulsifier, a stabilizer and a suspension aid.

A twelfth embodiment can include the battery of the eleventh embodiment, wherein the cellulose-based hydrogel is methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose or hydroxyethyl cellulose (HEC).

A thirteenth embodiment can include the battery of the eleventh or twelfth embodiment, wherein water-based cellulose hydrogel is combined with a polymer to increase mechanical strength and conductive properties.

A fourteenth embodiment can include the battery of the thirteenth embodiment, wherein the polymer is selected from the group consisting polyvinyl alcohol, polyvinylacetate, polyaniline, polyvinylpyrrolidone, polyvinylidene fluoride and polypyrrole.

A fifteenth embodiment can include the battery of the thirteenth embodiment, wherein 0-10 wt. % of the water-based cellulose hydrogel is cross-linked with 0-10 wt. % of the polymer.

A sixteenth embodiment can include the battery of the fifteenth embodiment, wherein cross-linking was done through solution blending and repeated freezing/thawing cycles.

A seventeenth embodiment can include the battery of the fifteenth embodiment, wherein the cross-linking was done through radiation treatment or epichlorohydrin.

An eighteenth embodiment can include the battery of any of the first to seventeenth embodiments, wherein the conductive carbon is TIMREX Primary Synthetic Graphite, TIMREX Natural Flake Graphite, TIMREX Dispersions; ENASCO 150G, 210G, 250G, 260G, 350G, 150P, 250P; SUPER P, SUPER P Li, carbon black, acetylene black, single walled carbon nanotubes, multi-walled carbon nanotubes or graphene.

A nineteenth embodiment can include the battery of any of the first to eighteenth embodiments, wherein the manganese oxide ($MnO_2$) is present in the composition of matter in a concentration of between 0-95 wt. %, the copper compound is present in the composition of matter in a concentration of between 0-95%, the bismuth compound is present in the composition of matter in a concentration of between 0-95%, the conductive carbon is present in the composition of matter in a concentration of between 5-95% and the binder is present in the composition of matter in a concentration of between 1-10 wt. %.

A twentieth embodiment can include the battery of the first embodiment, wherein the binder is mixed with 0-5% polytetrafluoroethylene.

A twenty first embodiment can include the battery of any of the first embodiment, wherein the electrode is formed of $MnO_2$, Cu, a copper compound, Bi, a bismuth compound, a mixture of $MnO_2$ and Cu, a mixture of $MnO_2$ and a copper compound.

A twenty second embodiment can include the battery of any of the first to twenty first embodiments, wherein the cathode has a porosity between 20-85%.

A twenty third embodiment can include the battery of any of the first to twenty second embodiments, wherein the cathode is a pasted electrode or a rolled electrode.

A twenty fourth embodiment can include the battery of the twenty third embodiment, wherein the pasted electrode or rolled electrode was formed by pressing at a pressure between 100-40000 psi.

A twenty fifth embodiment can include the battery of any of the first to twenty fourth embodiments, wherein the battery further comprises an electrolyte comprising an alkaline hydroxide.

A twenty sixth embodiment can include the battery the twenty fifth embodiment, wherein the alkaline hydroxide is selected from the group consisting of sodium hydroxide, potassium hydroxide, lithium hydroxide or a combination thereof.

A twenty seventh embodiment can include the battery of the twenty fifth embodiment, wherein the electrolyte has a concentration between 5 and 50 wt. %.

A twenty eighth embodiment can include the battery of any of the first to twenty seventh embodiments, further comprising a polymeric separator separates the cathode and anode.

A twenty ninth embodiment can include the battery of the twenty eighth embodiment, wherein the polymeric separator is cellophane, a sintered polymer film, or a hydrophilically modified polyolefin.

A thirtieth embodiment can include the battery of any of the first to twenty ninth embodiments, wherein the current collector is nickel, nickel-coated steel, tin-coated steel, copper plated nickel mesh, copper plated nickel foil, nickel plated copper mesh, nickel plated copper foil, silver coated copper mesh, silver coated copper foil, copper, aluminum, magnesium, tin, iron or a mesh with half nickel and half copper.

A thirty first embodiment can include the battery of any of the first to thirtieth embodiments, wherein the current collector is an expanded mesh, a perforated mesh, or a pocketed assembly.

A thirty second embodiment can include the battery of any of the first to thirty first embodiments, wherein the current collector is a tab that covers less than 0.2% of electrode area.

A thirty third embodiment can include the battery of any of the first to thirty second embodiments, wherein the battery has a cylindrical cell configuration or a prismatic cell configuration.

In a thirty fourth embodiment, a secondary alkaline battery comprises: an anode; a cathode comprising: a current collector contacting the electrode; an electrode that consists essentially of a copper or a salt of copper, the electrode surrounded by a composition of matter comprising: manganese oxide ($MnO_2$); a metal compound selected from the group consisting of tin, a salt of tin, aluminum, a salt of aluminum, magnesium, a salt of magnesium, iron, a salt of iron, vanadium, a salt of vanadium and combinations thereof; a bismuth compound selected from the group consisting of bismuth and a salt of bismuth; a binder; a conductive carbon.

A thirty fifth embodiment can include the battery of the thirty fourth embodiment, wherein the metal compound and its salts can be in powder form or metallic form, and wherein the metallic salts can be aluminum, aluminum hydroxide, aluminum oxide, aluminum oxinate, aluminum monostearate, aluminum hydroxide hydrate, aluminum silicate, bismuth aluminate hydrate, aluminum titanate, strontium aluminate, lithium aluminate, strontium lanthanum aluminate, zinc aluminum hydroxide, magnesium aluminum hydroxide, layered double hydroxides containing aluminum and carbonates, sodium aluminate and yttrium aluminum oxide, or iron, iron hydroxide, iron hydroxide hydrate, iron oxide, manganese iron oxide, copper iron oxide, zinc iron oxide, nickel zinc iron oxide, copper zinc iron oxide, barium ferrite or alloys of aluminum and iron, tin, tin oxide, indium tin oxide, antimony tin oxide, potassium stannate hydrate, stannous hydroxide, vanadium oxide, vanadium oxytriethoxide, vanadium oxyfluoride.nickel-vanadium alloy.

A thirty sixth embodiment can include the battery of the thirty fourth or thirty fifth embodiment, wherein in the copper and its salts can be included as powder form or metallic form.

A thirty seventh embodiment can include the battery of any of the thirty fourth to thirty sixth embodiments, wherein the role of copper and its salts, or the metal compounds and its salts are to reduce the charge transfer resistance of $MnO_2$ and its various polymorphs through intercalation or other mechanistic pathways.

A thirty eighth embodiment can include the battery of any of the first to thirty seventh embodiments, wherein the battery can be used for single-discharge or primary applications as well.

In a thirty ninth embodiment, a battery comprising an electrode comprises: a metal substrate that is at least partially plated by copper; a positive electrode comprising cathode material selected from the group consisting of a manganese compound, a bismuth compound, conductive carbon and combinations thereof; a negative electrode comprising anode material selected from the group consisting of zinc, a zinc compound, a binder, and combinations thereof; an alkaline electrolyte; a polymeric separator disposed between the positive electrode and the negative electrode; wherein the metal substrate is perforated on a side of the metal substrate facing the negative electrode.

In a fortieth embodiment, a battery comprises: an electrode that is plated with copper (Cu) and contains either a cathode material or an anode material, and an electrolyte.

A forty first embodiment can include the battery of the thirty ninth or fortieth embodiment, wherein the cathode material is selected from the group consisting of (1) manganese dioxide ($MnO_2$) mixed with bismuth (Bi) (2) a bismuth derivative mixed with conductive carbon.

A forty second embodiment can include the battery of any of the thirty ninth to forty first embodiments, wherein the anode material is selected from the group consisting of (1) zinc mixed with zinc oxide and a binder.

A forty third embodiment can include the battery of the fortieth embodiment, wherein the electrode comprises $MnO_2$.

A forty fourth embodiment can include the battery of the forty third embodiment, wherein the $MnO_2$ is selected from the group consisting of electrolytic manganese dioxide (EMD), chemically modified manganese oxide (CMD), birnessite (δ), alpha (α), beta (β), epsilon (ε), lambda (λ), and gamma (γ) forms of $MnO_2$.

A forty fifth embodiment can include the battery of any of the fortieth to forty fourth embodiments, wherein the electrode is a pocket-shaped assembly and is made from a metal in mesh, foam or plate form that improve the energy efficiency by more than 10-20% compared to standard pasted electrodes.

A forty sixth embodiment can include the battery of the forty fifth embodiment, wherein the metal is nickel, nickel plated on steel, iron, aluminum, magnesium, gliding metal, cartridge brass, phosphor bronze, yellow or high brass, manganese bronze, naval brass, muntz metal, aluminium bronze, beryllium copper, free-cutting brass, nickel silver, cupronickel, tin, tin coated steel, silver coated steel ounce or compositional metal and gunmetal or red brass.

A forty seventh embodiment can include the battery of the forty fifth embodiment, wherein the copper is plated on the metal.

A forty eighth embodiment can include the battery of the fortieth embodiment, wherein the method comprises a step of plating the copper on the metal by bright acid plating, flash copper plating, alkaline-complexed bath, acid-complexed bath or mildly alkaline-complexed bath.

A forty ninth embodiment can include the battery of the forty eighth embodiment, wherein the step of plating has a duration of at least one minute.

A fiftieth embodiment can include the battery of the forty eighth embodiment, wherein the step of plating has a duration between one minute to 24 hours.

A fifty first embodiment can include the battery of the forty fifth embodiment, wherein brass or bronze is plated on the metal.

A fifty second embodiment can include the battery of the fifty first embodiment, wherein the method comprises a step of plating the brass or the bronze on the metal over a duration of at least one a minute.

A fifty third embodiment can include the battery of the fifty second embodiment, wherein the method comprises a step of plating the brass or the bronze on the metal over a duration of between one minute to 24 hours.

A fifty fourth embodiment can include the battery of the forty fifth embodiment, wherein the copper either (1) covers the entire metal in the pocket-shaped assembly or (2) an inner surface of the pocket-shaped assembly or (3) an outer surface of the pocket-shaped assembly facing the electrolyte.

A fifty fifth embodiment can include the battery of the fortieth embodiment, wherein the bismuth derivative is bismuth oxide, a polymorph of bismuth oxide, bismuth hydroxide, bismuth nitrate or bismuth chloride.

A fifty sixth embodiment can include the battery of any of the fortieth to fifty fifth embodiments, further comprising Bi or derivatives of Bi as a powder in the electrolyte.

A fifty seventh embodiment can include the battery of any of the fortieth to fifty sixth embodiments, further comprising conductive carbon in the cathode material.

A fifty eighth embodiment can include the battery of the fifty seventh embodiment, wherein the conductive carbon is TIMREX Primary Synthetic Graphite (any types), TIMREX Natural Flake Graphite (any types), TIMREX Dispersions; ENASCO 150G, 210G, 250G, 260G, 350G, 150P, 250P; SUPER P, SUPER P Li, carbon black, acetylene black, Ketjen black (EC-300J, EC-600JD, EC-600JD Powder), carbon nanotubes (single or multi-walled) or graphene.

A fifty ninth embodiment can include the battery of the forty third embodiment, wherein the $MnO_2$ is 0-95 wt. %, bismuth or derivatives of bismuth are 0-95% and conductive carbon is 5-95%.

A sixtieth embodiment can include the battery of any of the fortieth to fifty ninth embodiments, wherein the cathode material has a porosity in the range of 20-85%.

A sixty first embodiment can include the battery of the fortieth embodiment, further comprising a pasted positive electrode.

A sixty second embodiment can include the battery of the fortieth embodiment, wherein the method comprises a step of pressing a pasted positive electrode or a rolled positive electrode between a current collector at 100-40000 psi.

A sixty third embodiment can include the battery of the fortieth embodiment, wherein the electrolyte comprises an alkaline hydroxide.

A sixty fourth embodiment can include the battery of the sixty third embodiment, wherein the alkaline hydroxide is sodium hydroxide, potassium hydroxide, cesium hydroxide, lithium hydroxide or a mixture thereof.

A sixty fifth embodiment can include the battery of the fortieth embodiment, wherein the electrolyte has a concentration between 5 and 50 wt. %.

A sixty sixth embodiment can include the battery of the fortieth embodiment, wherein a polymeric separator separates electrode layers.

A sixty seventh embodiment can include the battery of the sixty sixth embodiment, wherein the polymeric separator is cellophane, sintered polymer films, or hydrophilically modified polyolefins.

A sixty eighth embodiment can include the battery of the sixty seventh embodiment, further comprising a current collector in the form of an expanded mesh, metal foam, perforated mesh, perforated foil or a pocketed assembly.

A sixty ninth embodiment can include the battery of the sixty eighth embodiment, wherein the current collector tab covers less than 0.2% of electrode area.

A seventieth embodiment can include the battery of the sixty ninth embodiment, wherein the cell configuration is cylindrical or prismatic.

A seventy first embodiment can include the battery of the thirty eighth embodiment, wherein the battery can also be used for single-discharge or primary applications.

In a seventy second embodiment, a method of operating a battery having a structure as recited in any of the first to seventy first embodiments comprises the steps of: charging and discharging the battery a plurality of times.

A seventy third embodiment can include the method of the seventy second embodiment, wherein the battery maintains a ratio of an initial capacity to an operating capacity of at least about 80%.

A seventy third embodiment can include the method of the seventy third embodiment, wherein the ratio of maintained for at least 100 charging and discharging cycles.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A secondary alkaline battery comprising:
an anode;
a cathode; and
an electrolyte, wherein the cathode comprises:
  a current collector;
  a cathode mixture in electrical contact with the current collector, wherein the cathode mixture comprises:
    birnessite (δ) phase manganese oxide;

a copper compound comprising copper, a salt of copper, a copper oxide, an alloy thereof, or any combination thereof;

a bismuth compound comprising bismuth, a salt of bismuth, bismuth oxide, or any combination thereof; and a conductive carbon, and wherein the cathode mixture is enclosed within a pocket assembly, wherein the pocket assembly comprises at least two sheets, wherein a first sheet of the at least two sheets comprises a solid foil, and wherein a second sheet of the at least two sheets comprises a permeable foil.

2. The secondary alkaline battery of claim 1, further comprising a first composition in contact with the current collector and disposed between the current collector and the cathode mixture, wherein the first composition consists essentially of copper, a salt of copper, a copper oxide, an alloy thereof, or a combination thereof.

3. The secondary alkaline battery claim 1, wherein the cathode mixture further comprises electrolytic manganese dioxide (EMD), chemically modified manganese oxide (CMD), alpha (α) $MnO_2$, beta (β) $MnO_2$, epsilon (ε) $MnO_2$, lambda (λ) $MnO_2$, gamma (γ) $MnO_2$, or any combination thereof.

4. The secondary alkaline battery claim 1, wherein the copper compound is copper (I) oxide, copper (II) oxide, a copper hydroxide, a copper nitrate, a copper chloride, a gliding metal, cartridge brass, phosphor bronze, yellow or high brass, manganese bronze, naval brass, muntz metal, aluminium bronze, beryllium copper, free-cutting brass, nickel silver, cupronickel, ounce metal, compositional metal, gunmetal, or red brass.

5. The secondary alkaline battery claim 1, wherein the copper compound is present in the cathode mixture as a powder.

6. The secondary alkaline battery claim 1, wherein the bismuth compound is a bismuth oxide, a bismuth hydroxide, a bismuth nitrate, a bismuth chloride, or any combination thereof.

7. The secondary alkaline battery claim 1, wherein the bismuth compound is present in the cathode mixture as a powder.

8. The secondary alkaline battery claim 1, wherein the cathode mixture further comprises a binder, wherein the binder is free of polytetrafluoroethylene.

9. The secondary alkaline battery claim 1, wherein the cathode mixture further comprises a binder, wherein the binder is a cellulose-based hydrogel that is cross-linked with a polymer.

10. The secondary alkaline battery claim 9, wherein the cellulose-based hydrogel is methyl cellulose (MC), carboxymethyl cellulose (CMC), hydroxypropyl cellulose (HPC), hydroxypropylmethyl cellulose (HPMC), hydroxyethylmethyl cellulose (HEMC), carboxymethylhydroxyethyl cellulose, or hydroxyethyl cellulose (HEC).

11. The secondary alkaline battery claim 9, wherein the polymer is selected from the group consisting polyvinyl alcohol, polyvinylacetate, polyaniline, polyvinylpyrrolidone, polyvinylidene fluoride, and polypyrrole.

12. The secondary alkaline battery claim 1, wherein the conductive carbon is a synthetic graphite, a natural flake graphite, a graphite dispersion, carbon black, acetylene black, single walled carbon nanotubes, multi-walled carbon nanotubes, graphene, or any combination thereof.

13. The secondary alkaline battery claim 1, wherein the cathode mixture further comprises a binder, and wherein the birnessite phase manganese oxide ($MnO_2$) is present in the cathode mixture in a concentration of between 0-95 wt. %, the copper compound is present in the cathode mixture in a concentration of between 0-95 wt. %, the bismuth compound is present in the cathode mixture in a concentration of between 0-95 wt. %, the conductive carbon is present in the cathode mixture in a concentration of between 5-95 wt. %, and the binder is present in the cathode mixture in a concentration of between 1-10 wt. %.

14. The secondary alkaline battery claim 1, wherein the cathode is a pasted electrode or a rolled electrode.

15. The secondary alkaline battery claim 1, further comprising a polymeric separator disposed between the cathode and the anode.

16. The secondary alkaline battery claim 1, wherein the current collector is nickel, nickel-coated steel, tin-coated steel, copper plated nickel mesh, copper plated nickel foil, nickel plated copper mesh, nickel plated copper foil, silver coated copper mesh, silver coated copper foil, copper, magnesium, aluminum, tin, iron, or a mesh with half nickel and half copper.

17. A secondary alkaline battery comprising:
an anode; and
a cathode, wherein the cathode comprises:
a current collector; and
a cathode mixture electrically coupled to the current collector, wherein the cathode mixture comprises:
birnessite phase manganese oxide ($MnO_2$);
a metal compound comprising: tin, a salt of tin, aluminum, a salt of aluminum, iron, a salt of iron, magnesium, a salt of magnesium, vanadium, a salt of vanadium, or any combination thereof;
a bismuth compound comprising bismuth, a salt of bismuth, a bismuth oxide, or any combination thereof; and
a conductive carbon, and
wherein the current collector forms a pocket assembly, wherein the cathode mixture is enclosed within the pocket assembly, wherein the pocket assembly comprises at least two sheets, wherein a first sheet of the at least two sheets comprises a solid foil, and wherein a second sheet of the at least two sheets comprises a permeable foil.

18. The secondary alkaline battery claim 17, further comprising a first composition comprising copper, a salt of copper, an alloy thereof, or any combination thereof disposed between the cathode mixture and the current collector.

19. The secondary alkaline battery claim 18, wherein the metal compound and its salts can be in powder form or metallic form.

20. The secondary alkaline battery claim 17, where the current collector is plated with copper, a copper alloy, or any combination thereof.

21. The secondary alkaline battery claim 17, wherein the cathode mixture does not comprise a binder.

22. The secondary alkaline battery of claim 17, wherein the cathode mixture does not comprise copper.

23. A battery comprising an electrode comprising
a metal substrate that is at least partially plated by copper, a copper alloy, or any combination thereof;
a positive electrode comprising a cathode material, wherein the cathode material comprises a manganese compound and a bismuth compound, wherein the manganese compound comprises a birnessite phase manganese dioxide;

a negative electrode comprising an anode material, wherein the anode material comprises zinc, a zinc compound, or any combination thereof;

an alkaline electrolyte; and a polymeric separator disposed between the positive electrode and the negative electrode;

wherein the metal substrate forms a pocket-shaped assembly, wherein the pocket-shaped assembly comprises a first sheet comprising a solid foil and a second sheet comprising a permeable foil, wherein the second sheet is permeable to the alkaline electrolyte and positioned on a side of the metal substrate facing the polymeric separator, and wherein the pocket-shaped assembly encloses the cathode material.

24. The battery of claim 23, wherein the cathode material is selected from the group consisting of: manganese dioxide mixed with bismuth, a bismuth derivative mixed with a conductive carbon, copper, or any combination thereof.

25. The battery of claim 23, wherein the anode material comprises zinc mixed with zinc oxide and a binder.

26. The battery of claim 23, wherein the manganese compound further comprises electrolytic manganese dioxide (EMD), chemically modified manganese oxide (CMD), alpha ($\alpha$) $MnO_2$, beta ($\beta$) $MnO_2$, epsilon ($\varepsilon$) $MnO_2$, lambda ($\lambda$) $MnO_2$, gamma ($\gamma$) $MnO_2$, or any combination thereof.

27. The battery of claim 23, wherein a metal of the metal substrate is nickel, nickel plated on steel, iron, aluminum, magnesium, gliding metal, cartridge brass, phosphor bronze, yellow or high brass, manganese bronze, naval brass, muntz metal, aluminum bronze, beryllium copper, free-cutting brass, nickel silver, cupronickel, tin, tin coated steel, silver coated steel ounce or compositional metal and gunmetal or red brass, or any combination thereof.

28. The battery of claim 23, wherein the copper, the copper alloy, or the combination thereof is plated on the metal substrate.

29. The battery of claim 23, wherein the copper, the copper alloy, or the combination thereof covers the entire metal of the metal substrate in the pocket-shaped assembly, an inner surface of the pocket-shaped assembly, or an outer surface of the pocket-shaped assembly facing the polymeric separator.

30. The battery of claim 23, wherein the cathode material further comprises conductive carbon in the cathode material.

31. The battery of claim 30 wherein the cathode material comprises the birnessite phase $MnO_2$ in an amount of 0-95 wt. %, bismuth or derivatives of bismuth in an amount of 0-95 wt. %, and conductive carbon in an amount of 5-95 wt. %.

32. The battery of claim 23, further comprising a mesh enclosed within the pocket assembly.

* * * * *